United States Patent
Kim et al.

(10) Patent No.: US 11,704,330 B2
(45) Date of Patent: *Jul. 18, 2023

(54) USER INTERFACE FOR GENERATING DATA VISUALIZATIONS THAT USE TABLE CALCULATIONS

(71) Applicant: Tableau Software, Inc., Seattle, WA (US)

(72) Inventors: Jun Kim, Sammamish, WA (US); Christopher Richard Stolte, Seattle, WA (US); Jock Douglas Mackinlay, Clyde Hill, WA (US); Ross Thomas Bunker, Seattle, WA (US); Bora Beran, Santa Fe, NM (US); Justin Talbot, Seattle, WA (US)

(73) Assignee: Tableau Software, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/961,843

(22) Filed: Oct. 7, 2022

(65) Prior Publication Data

US 2023/0037179 A1   Feb. 2, 2023

Related U.S. Application Data

(63) Continuation of application No. 16/846,183, filed on Apr. 10, 2020, now Pat. No. 11,475,028, which is a
(Continued)

(51) Int. Cl.
*G06F 3/048* (2013.01)
*G06F 16/248* (2019.01)
(Continued)

(52) U.S. Cl.
CPC .......... *G06F 16/248* (2019.01); *G06F 3/0482* (2013.01); *G06F 3/04842* (2013.01); *G06F 3/04847* (2013.01); *G06T 11/206* (2013.01)

(58) Field of Classification Search
CPC .. G06F 16/248; G06F 3/0482; G06F 3/04842; G06F 3/04847; G06T 11/206
See application file for complete search history.

(56) References Cited

U.S. PATENT DOCUMENTS 7,800,613 B2 * 9/2010 Hanrahan ............. G06T 11/206
345/440
8,306,971 B2   11/2012 Stolte et al.
(Continued)

OTHER PUBLICATIONS

*Tableau, Addressing and Partitioning*, Jul. 19, 2013, from, http://onlinehelp.tableausoftware.com/v8.0/pro/online/en-us/calculations_tablecalculations_understanding_addressing.html, 3 pgs.
(Continued)

*Primary Examiner* — Mahelet Shiberou
(74) *Attorney, Agent, or Firm* — Morgan, Lewis & Bockius LLP

(57) ABSTRACT

An electronic device displays a chart, which includes a first set of visual marks that represent values derived from a set of data. The device concurrently displays a chart-calculations-options area. The chart-calculations-options area displays a first plurality of options for type of calculation. The device detects user selection of (i) a first option, from the first plurality of options, for type of calculation and (ii) a second option corresponding to a parameter for the selected first option. In response to detecting the user selection, the device visually distinguishes visual marks in a second set of visual marks in the chart. The second set of visual marks is distinct from the first set of visual marks and corresponds to the first option for type of calculation and the second option corresponding to the parameter for the selected first option.

20 Claims, 23 Drawing Sheets

Related U.S. Application Data continuation of application No. 16/216,933, filed on Dec. 11, 2018, now Pat. No. 10,620,793, which is a continuation of application No. 14/846,979, filed on Sep. 7, 2015, now Pat. No. 10,152,203.

(60) Provisional application No. 62/047,641, filed on Sep. 8, 2014.

(51) Int. Cl.
| | | |
|---|---|---|
| *G06T 11/20* | (2006.01) | |
| *G06F 3/0482* | (2013.01) | |
| *G06F 3/04842* | (2022.01) | |
| *G06F 3/04847* | (2022.01) | |

(56) References Cited

U.S. PATENT DOCUMENTS

| | | |
|---|---|---|
| 9,449,062 B2 | 9/2016 | Latzina |
| 10,176,533 B2 | 1/2019 | Waner |

OTHER PUBLICATIONS

Steiner Analytics, Fighting with your Tableau Table Calculations? Here is a Visual Way to Wrangle Them, Analytics, Table Calculations, *Tableau*, May 29, 2014, http://steineranalytics.com/2014/05/29/visual-way-to-wrangle-tableau-table-calculations/, 11 pgs.

Li et al., Tableau Customer Conference 2013, Table Calculation Fundamentals, Copyright 2013 *Tableau Software*, from http://tcc13.tableauconference.com/sites/default/files/materials/Table%20Calculation%20Fundamentals.pdf, 38 pgs.

Kim, Office Action, U.S. Appl. No. 14/846,979, dated Feb. 16, 2018, 6 pgs.

Kim, Notice of Allowance, U.S. Appl. No. 14/846,979, dated Sep. 11, 2018, 7 pgs.

Kim, Office Action U.S. Appl. No. 16/216,933, dated Jul. 8, 2019, 9 pgs.

Kim, Notice of Allowance, U.S. Appl. No. 16/216,933, dated Dec. 18, 2019, 7 pgs.

Kim, Office Action U.S. Appl. No. 16/846,183, dated Apr. 22, 2022, 13 pgs.

Kim, Notice of Allowance, U.S. Appl. No. 16/846,183, dated Jun. 16, 2022, 5 pgs.

* cited by examiner

500

┌─────────────────────────────────────────────────────────────────┐
│ Display a chart on a display.                                   │ ─ 502
│ The chart includes visual marks that represent calculated values derived │
│ from a set of data.                                             │
│ The chart includes a plurality of rows and a plurality of columns. │
│ The chart includes a plurality of panes formed by intersection of the plurality │
│ of rows and the plurality of columns.                           │
│ A current focus is on a first visual mark at a first position in a first pane in │
│ the plurality of panes.                                         │
│ ┌─────────────────────────────────────────────────────────────┐ │
│ │ A respective pane in the plurality of panes includes a plurality of visual │ ─ 505
│ │ marks                                                       │ │
│ └─────────────────────────────────────────────────────────────┘ │
│ ┌─────────────────────────────────────────────────────────────┐ │
│ │ A respective pane in the plurality of panes includes a plurality of visual │ ─ 506
│ │ marks, with each visual mark in the plurality of visual marks │ │
│ │ corresponding to a sub-column within the respective pane    │ │
│ └─────────────────────────────────────────────────────────────┘ │
│ ┌─────────────────────────────────────────────────────────────┐ │
│ │ A respective pane in the plurality of panes includes a plurality of visual │ ─ 508
│ │ marks, with each visual mark in the plurality of visual marks │ │
│ │ corresponding to a sub-row within the respective pane       │ │
│ └─────────────────────────────────────────────────────────────┘ │
└─────────────────────────────────────────────────────────────────┘

┌─────────────────────────────────────────────────────────────────┐
│ Concurrently display a chart-calculations-options area with the chart on the │ ─ 510
│ display.                                                        │
│ The chart-calculations-options area includes display of         │
│ one or more options for a type of calculation, and              │
│ one or more options for a type of data partitioning.            │
│ ┌─────────────────────────────────────────────────────────────┐ │
│ │ The options for a type of data partitioning include performing a │ ─ 512
│ │ selected type of calculation on data that corresponds to each row in │ │
│ │ the chart, performing a selected type of calculation on data that │ │
│ │ corresponds to each column in the chart, performing a selected type │ │
│ │ of calculation on data that corresponds to the entire chart, performing │ │
│ │ a selected type of calculation on data that corresponds to each pane │ │
│ │ in the chart, performing a selected type of calculation on data that │ │
│ │ corresponds to calculated values progressing left-to-right, then top-to- │ │
│ │ bottom in the chart, and/or performing a selected type of calculation │ │
│ │ on data that corresponds to calculated values progressing top-to- │ │
│ │ bottom, then left-to-right in the chart.                    │ │
│ └─────────────────────────────────────────────────────────────┘ │
└─────────────────────────────────────────────────────────────────┘

Figure 5A (B)

While displaying visual marks in the first set of visual marks visually distinguished from other visual marks in the chart, detect an input that changes the current focus to a second visual mark in a second pane in the plurality of panes, distinct from the first visual mark; and, in response to detecting the input that changes the current focus to a second visual mark in a second pane in the plurality of panes, visually distinguish visual marks in a third set of visual marks from other visual marks in the chart.
The third set of visual marks is distinct from the first set of visual marks.
The third set of visual marks includes the second visual mark.
The third set of visual marks corresponds to the first selected option for a type of calculation and the first selected option for a type of data partitioning. — 522

While displaying visual marks in the first set of visual marks visually distinguished from other visual marks in the chart with the current focus on the first visual mark, detect an input that selects a second option for a type of calculation, distinct from the first option for a type of calculation; and, in response to detecting the input that selects the second option for a type of calculation, visually distinguish visual marks in a fourth set of visual marks from other visual marks in the chart.
The fourth set of visual marks is distinct from the first set of visual marks.
The fourth set of visual marks includes a visual mark at the first position in the first pane.
The fourth set of visual marks corresponds to the second selected option for a type of calculation and a selected option for a type of data partitioning. — 524

While displaying visual marks in the first set of visual marks visually distinguished from other visual marks in the chart, detect a first input; and, in response to detecting the first input:
cease to display the chart-calculations-options area and cease to visually distinguish visual marks in the first set of visual marks from other visual marks in the chart. — 526

Figure 5C

USER INTERFACE FOR GENERATING DATA VISUALIZATIONS THAT USE TABLE CALCULATIONS

RELATED APPLICATIONS

This application is a continuation of U.S. patent application Ser. No. 16/846,183, filed Apr. 10, 2020, entitled "User Interface for Generating Data Visualizations that Use Table Calculations," which is a continuation of U.S. patent application Ser. No. 16/216,933, filed Dec. 11, 2018, entitled "User Interface for Generating Data Visualizations that Use Table Calculations," now U.S. Pat. No. 10,620,793, issued on Apr. 14, 2020, which is a continuation of U.S. patent application Ser. No. 14/846,979, filed Sep. 7, 2015, entitled "Devices and Methods for Selecting and Displaying Chart Calculation Options," now U.S. Pat. No. 10,152,203, issued on Dec. 11, 2018, which claims priority to U.S. Provisional Application Ser. No. 62/047,641, filed Sep. 8, 2014, entitled "Devices and Methods for Selecting and Displaying Chart Calculation Options," each of which is incorporated by reference herein in its entirety.

TECHNICAL FIELD

This invention relates generally to devices and methods for displaying charts, including but not limited to selecting and displaying chart calculation options.

BACKGROUND

Data sets with hundreds of variables arise today in many contexts, including, for example: gene expression data for uncovering the link between the genome and the various proteins for which it codes; demographic and consumer profiling data for capturing underlying sociological and economic trends; sales and marketing data for huge numbers of products in vast and ever-changing marketplaces; and environmental measurements for understanding phenomena such as pollution, meteorological changes and resource impact issues.

Data visualization is a powerful tool for exploring large data sets, both by itself and coupled with data mining algorithms. Graphical views provide user-friendly ways to visualize and interpret data.

However, the task of effectively visualizing large databases imposes significant demands on the human-computer interface to the visualization system. Even specifying what should be calculated and shown in a chart or other data visualization can be problematic.

Consequently, there is a need for faster, more efficient methods and interfaces for selecting and displaying chart calculation options. Such methods and interfaces may complement or replace conventional methods for selecting and displaying chart calculation options. Such methods and interfaces reduce the cognitive burden on a user and produce a more efficient human-machine interface. For battery-operated devices, such methods and interfaces conserve power and increase the time between battery charges.

SUMMARY

The above deficiencies and other problems associated with selecting and displaying chart calculation options are reduced or eliminated by the disclosed methods, devices, and storage mediums. Various implementations of methods, devices, and storage mediums within the scope of the appended claims each have several aspects, no single one of which is solely responsible for the attributes described herein. Without limiting the scope of the appended claims, after considering this disclosure, one will understand how the aspects of various implementations are used to visualize data.

In accordance with some embodiments, a method is performed at an electronic device with a display. The method includes displaying a chart on the display. The chart includes visual marks that represent calculated values derived from a set of data. The chart includes a plurality of rows and a plurality of columns. The chart includes a plurality of panes formed by intersection of the plurality of rows and the plurality of columns. A current focus is on a first visual mark at a first position in a first pane in the plurality of panes. The method also includes concurrently displaying a chart-calculations-options area with the chart on the display. The chart-calculations-options area includes display of one or more options for a type of calculation, and one or more options for a type of data partitioning. Visual marks in a first set of visual marks are visually distinguished from other visual marks in the chart. The first set of visual marks includes the first visual mark, and the first set of visual marks corresponds to a first selected option for a type of calculation and a first selected option for a type of data partitioning. In some embodiments, the method also includes detecting an input that selects a second option for a type of data partitioning, distinct from the first option for a type of data partitioning; and, in response to detecting the input that selects the second option for a type of data partitioning, visually distinguishing visual marks in a second set of visual marks from other visual marks in the chart. The second set of visual marks is distinct from the first set of visual marks. The second set of visual marks includes a visual mark at the first position in the first pane. The second set of visual marks corresponds to the first selected option for a type of calculation and the second selected option for a type of data partitioning.

In accordance with some embodiments, an electronic device includes a display, one or more processors, memory, and one or more programs; the one or more programs are stored in the memory and configured to be executed by the one or more processors and the one or more programs include instructions for performing the operations of the method described above. In accordance with some embodiments, a graphical user interface on an electronic device with a display, a memory, and one or more processors to execute one or more programs stored in the memory includes one or more of the elements displayed in the method described above, which are updated in response to inputs, as described in the method described above. In accordance with some embodiments, a computer readable storage medium has stored therein instructions which when executed by an electronic device with a display and one or more processors, cause the device to perform the operations of the method described above. In accordance with some embodiments, an electronic device includes: a display, and means for performing the operations of the method described above.

Thus, electronic devices with displays are provided with faster, more efficient methods and interfaces for selecting and displaying chart calculation options, thereby increasing the effectiveness, efficiency, and user satisfaction with such devices. Such methods and interfaces may complement or replace conventional methods for selecting and displaying chart calculation options.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate the more pertinent features of the present disclosure and are therefore not to be considered limiting, for the description may admit to other effective features.

FIGS. 5A-5C are flow diagrams illustrating a method of selecting and displaying chart calculation options in accordance with some embodiments.

Figure 1:
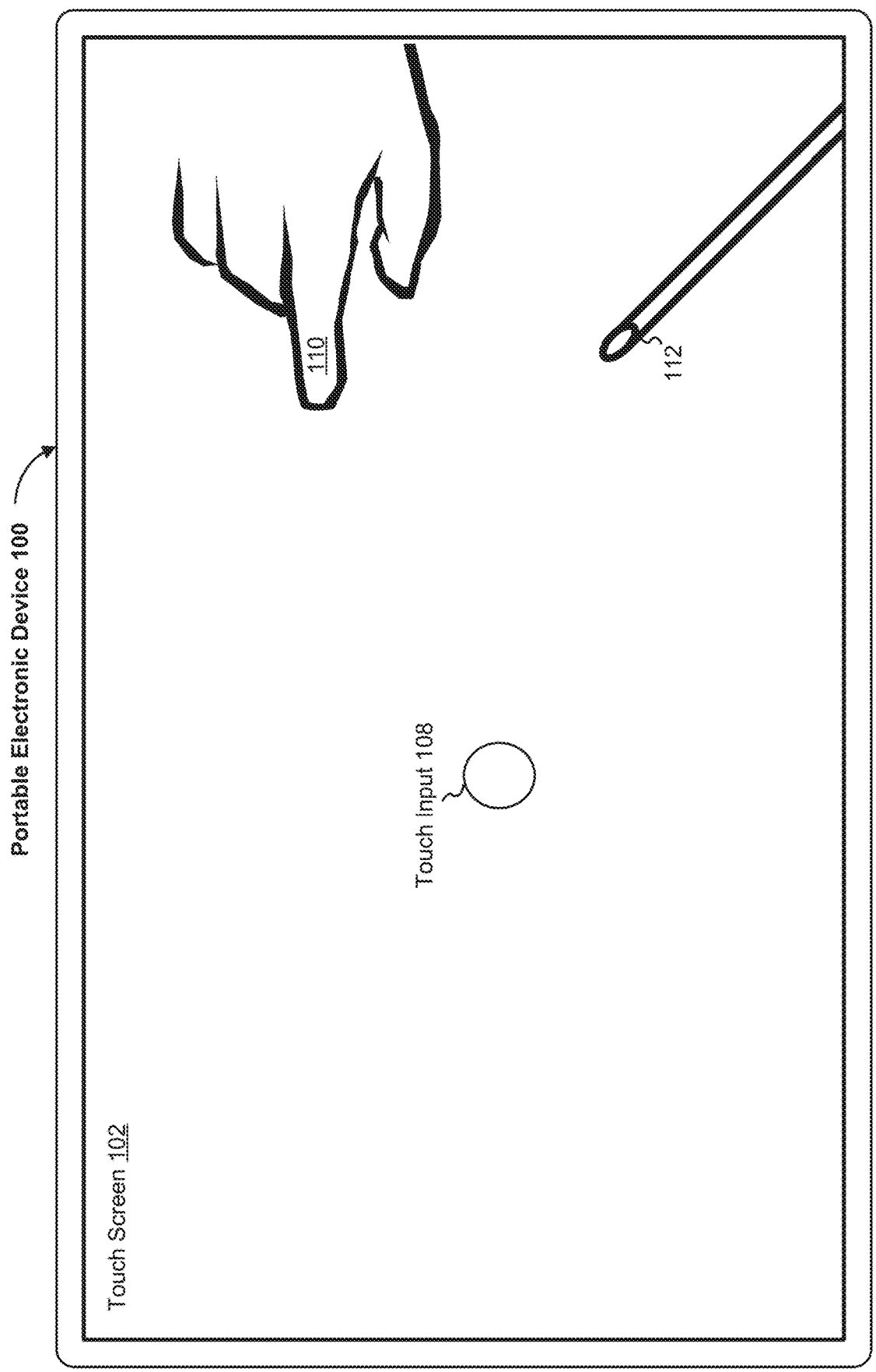
FIG. 1 illustrates a portable electronic device in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system or device. Finally, like reference numerals may be used to denote like features throughout the specification and figures.

DETAILED DESCRIPTION

As noted above, the task of effectively visualizing large databases imposes significant demands on the human-computer interface to the visualization system. Even specifying what should be calculated and shown in a chart or other data visualization can be problematic.

For example, for a graph containing multiple panes in a grid, a user may want to make calculations that use data underlying a single pane, a row of panes, a column of panes, a sub-row of panes, a sub-column of panes, or all of the panes. It may be difficult for a user to specify the desired calculations and type of data partitioning.

Here, devices and methods are disclosed that improve the selection and display of chart calculations options. The user specifies a type of calculation and a type of data partitioning via a chart-calculations options area. The chart is updated in real time in response to the users selections. In addition, a set of visual marks in the chart (e.g., a set bars in a bar chart) is displayed that are visually distinguished from other visual marks in the chart (e.g., other bars in the bar chart). This set of visual marks provides a simple, intuitive visual indication to the user of what chart calculation options have been selected. Thus, the user can immediately tell if the specified type of calculation and the type of data partitioning are what the user wants. If the specified type of calculation and the type of data partitioning are not what the user wants, the user can easily change the chart calculation options, see the updated chart, and see a new set of visually distinguished marks that indicate the currently selected chart calculation options. Thus, a user is able to make the chart intended by the user in a faster, simpler, and more efficient manner.

Figure 4A:
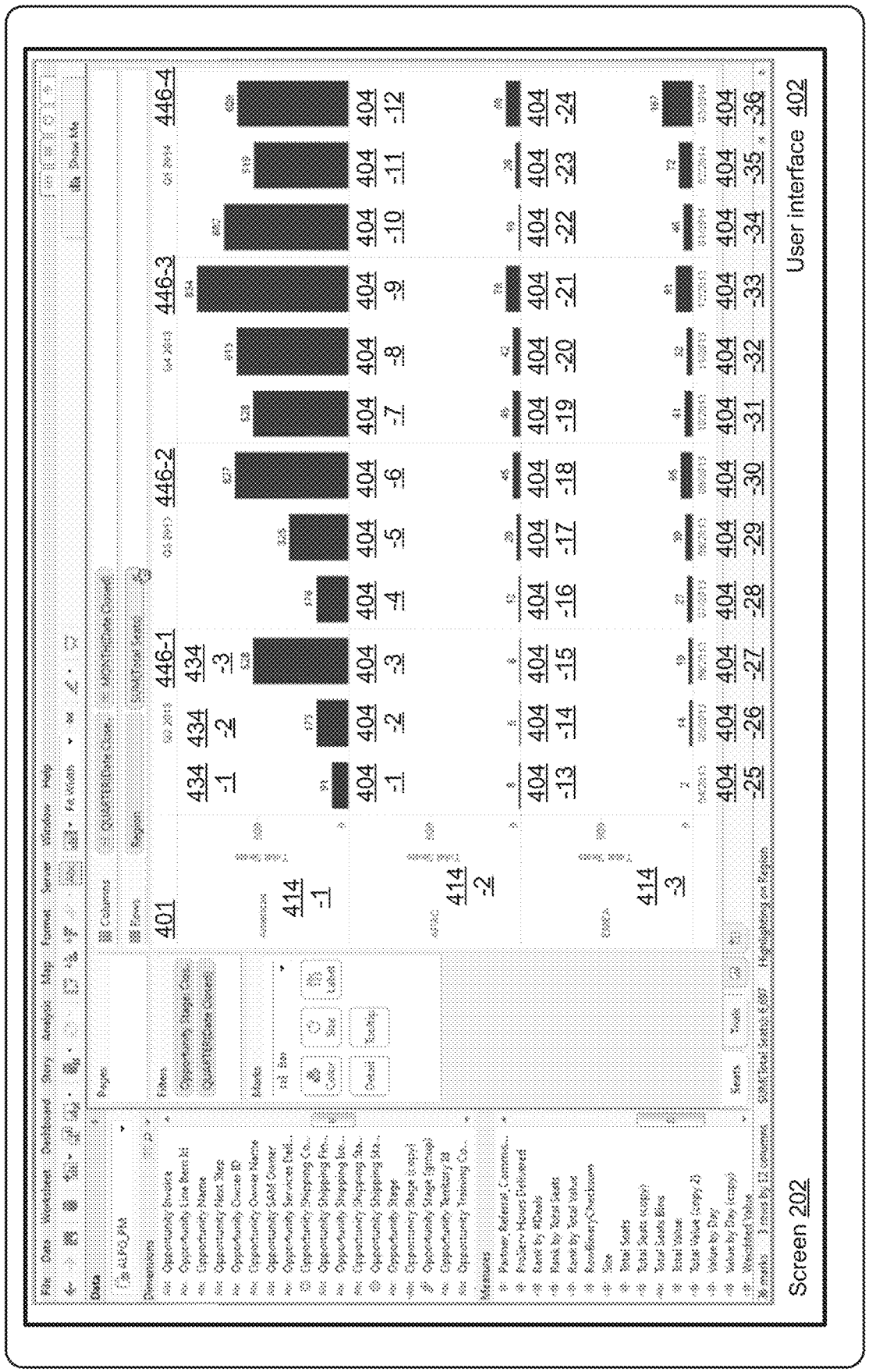
FIGS. 4A-4P illustrate exemplary user interfaces for selecting and displaying chart calculation options in accordance with some embodiments.
Figure 4P:
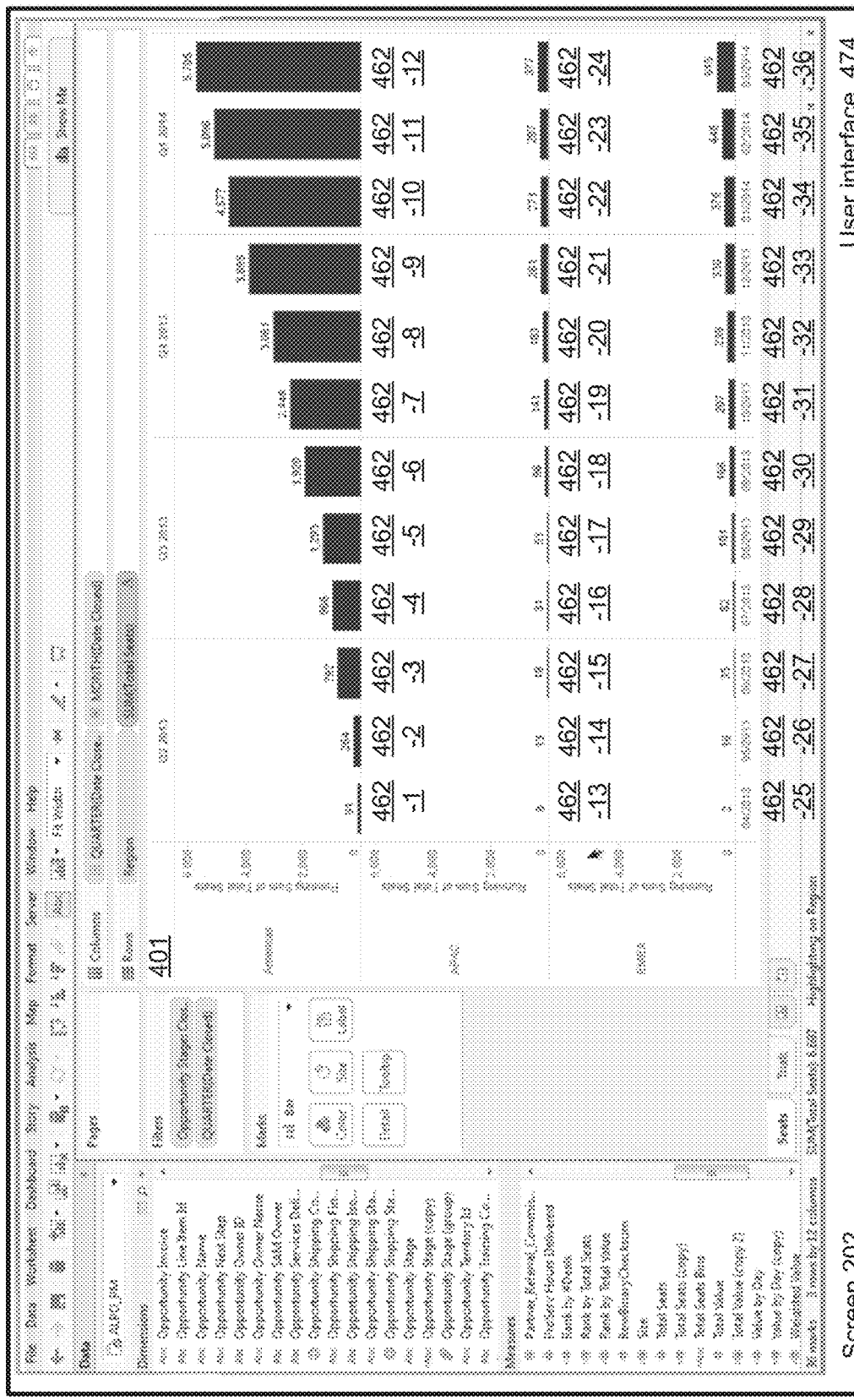
Figure 5B:
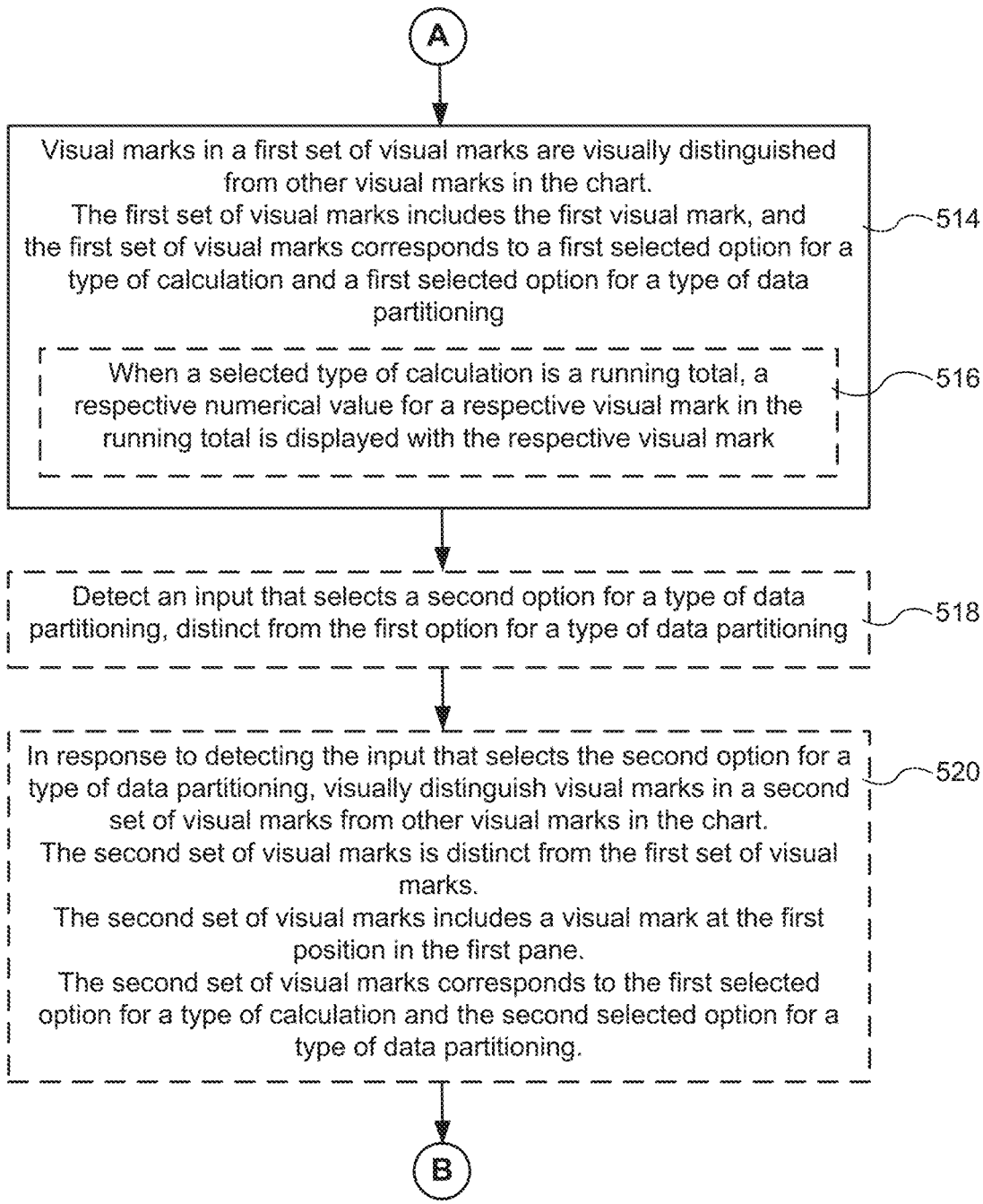

Below, FIGS. 1-3B provide a description of exemplary devices. FIGS. 4A-4P illustrate exemplary user interfaces for selecting and displaying chart calculation options. FIGS. 5A-5C are flow diagrams illustrating a method of selecting and displaying chart calculation options. The user interfaces in FIGS. 4A-4P are used to illustrate the processes in FIGS. 5A-5C.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first set of visual marks could be termed a second set of visual marks, and, similarly, a second set of visual marks could be termed a first set of visual marks, without departing from the scope of the various described embodiments. The first set of visual marks and the second set of visual marks are both sets of visual marks, but they are not the same set of visual marks.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Attention is now directed toward embodiments of electronic devices with displays. Embodiments of electronic devices and user interfaces for such devices are described. In some embodiments, the device is a portable communications device, such as a mobile telephone, that also contains other functions, such as PDA and/or music player functions. Other portable electronic devices, such as laptops or tablet computers are, optionally, used. It should also be understood that, in some embodiments, the device is not a portable communications device, but is a desktop computer with a display. In the discussion that follows, an electronic device that includes a display is described. The electronic device includes one or more physical user-interface devices, such as a touch-sensitive display, a track pad, a physical keyboard, a mouse, and/or a joystick.

FIG. 1 illustrates a portable electronic device 100 in accordance with some embodiments. In some embodiments, device 100 is a mobile phone, a laptop computer, a personal digital assistant (PDA), or a tablet computer. In some embodiments, portable electronic device 100 includes touch screen 102, which is also sometimes called a touch-sensitive display and/or a touch-sensitive display system. Touch screen 102 optionally displays one or more graphics within a user interface (UI). In some embodiments, a user is enabled to select one or more of the graphics by making a touch input (e.g., touch input 108) on the graphics. In some instances, the touch input is a contact on the touch screen. In some instances, the touch input is a gesture that includes a contact and movement of the contact on the touch screen. In some instances, the gesture optionally includes one or more taps, one or more swipes (from left to right, right to left, upward and/or downward) and/or a rolling of a finger (from right to left, left to right, upward and/or downward) that has made contact with device 100. For example, a touch input on the graphics is optionally made with one or more fingers 110 (not drawn to scale in the figure) or one or more styluses 112 (not drawn to scale in the figure). In some embodiments, selection of one or more graphics occurs when the user breaks contact with the one or more graphics. In some circumstances, inadvertent contact with a graphic does not select the graphic. For example, a swipe gesture that sweeps over a visual mark optionally does not select the visual mark when the gesture corresponding to selection is a tap. Device 100 optionally also includes one or more physical buttons and/or other input/output devices, such as a microphone for verbal inputs, a physical keyboard, a mouse, and/or a joystick.

Figure 2:
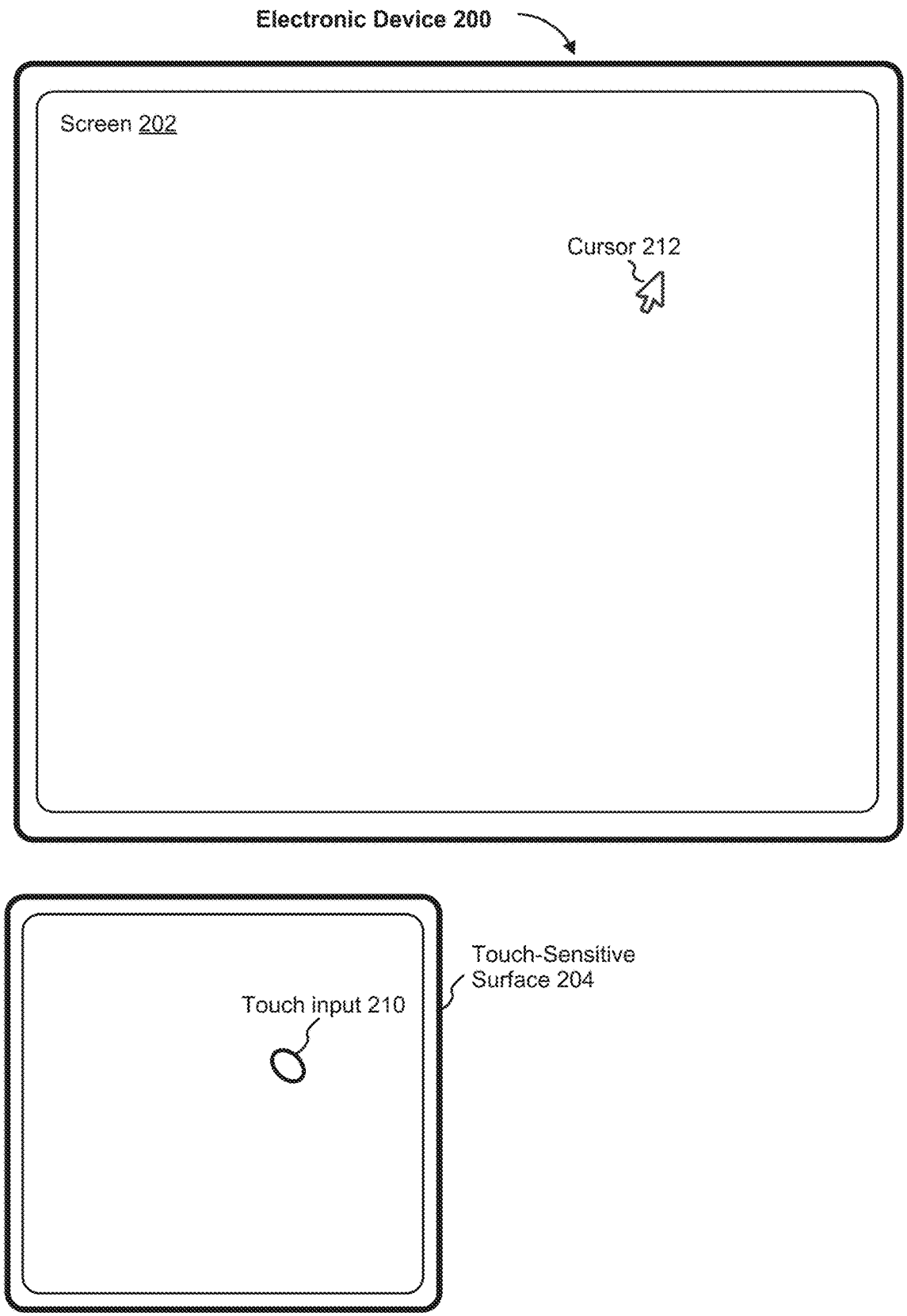
FIG. 2 illustrates an electronic device in accordance with some embodiments.

FIG. 2 illustrates an electronic device 200 in accordance with some embodiments. Device 200 need not be portable. In some embodiments, device 200 is a laptop computer, a desktop computer, a tablet computer, or an educational device. Device 200 includes screen 202. In some embodiments, device 200 includes touch-sensitive surface 204. Screen 202 optionally displays one or more graphics within a UI. In some embodiments, a user is enabled to select one or more of the graphics by making a touch input (e.g., touch input 210) on touch-sensitive surface 204 such that a corresponding cursor (e.g., cursor 212) on screen 202 selects the one or more graphics. For example, when an input is detected on touch-sensitive surface 204 while cursor 212 is over a particular user interface element (e.g., a button, window, slider or other user interface element), the particular user interface element is adjusted in accordance with the detected input.

Figure 3A:
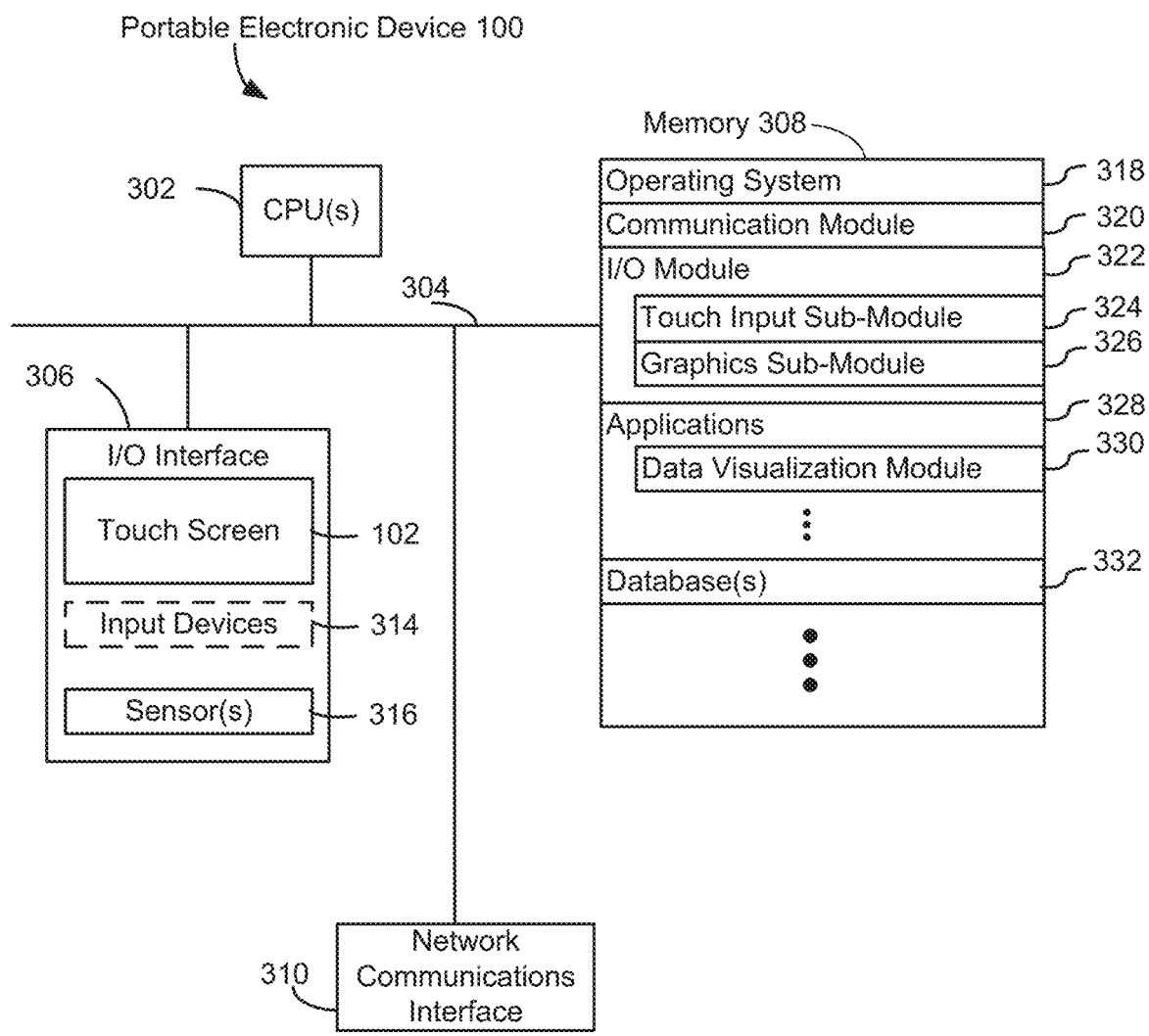
FIG. 3A is a block diagram illustrating a portable electronic device in accordance with some embodiments.

FIG. 3A is a block diagram illustrating a portable electronic device 100, in accordance with some embodiments. It should be appreciated that device 100 is only one example of a portable electronic device, and that device 100 optionally has more or fewer components than shown, optionally combines two or more components, or optionally has a different configuration or arrangement of the components. The various components shown in FIG. 3A are implemented in hardware, software, or a combination of both hardware and software, including one or more signal processing and/or application specific integrated circuits.

Device 100 includes one or more processing units (CPU's) 302, input/output (I/O) subsystem 306, memory 308 (which optionally includes one or more computer readable storage mediums), and network communications interface 310. These components optionally communicate over one or more communication buses or signal lines 304. Communication buses 304 optionally include circuitry (sometimes called a chipset) that interconnects and controls communications between system components.

Memory 308 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 308 optionally includes one or more storage devices remotely located from processor(s) 302. Memory 308, or alternately the non-volatile memory device(s) within memory 308, comprises a non-transitory computer readable storage medium.

In some embodiments, the software components stored in memory 308 include operating system 318, communication module 320, input/output (I/O) module 322, and applications 328. In some embodiments, one or more of the various modules comprises a set of instructions in memory 308. In some embodiments, memory 308 stores one or more data sets in one or more database(s) 332.

Operating system 318 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 320 connects the electronic device 100 to other computers via the one or more communication network interfaces 310 (wired or wireless) and one or more communication networks, such as the Internet, cellular telephone networks, mobile data networks, other wide area networks, local area networks, metropolitan area networks, and so on; facilitates communication with other devices over one or more external ports; and also includes various software components for handling data received by from other devices.

I/O module 322 includes touch input sub-module 324 and graphics sub-module 326. Touch input sub-module 324 optionally detects touch inputs with touch screen 102 and other touch sensitive devices (e.g., a touchpad or physical click wheel). Touch input sub-module 324 includes various software components for performing various operations related to detection of a touch input, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Touch input sub-module 324 receives contact data from the touch-sensitive surface (e.g., touch screen 102). These operations are, optionally, applied to single touch inputs (e.g., one finger contacts) or to multiple simultaneous touch inputs (e.g., "multitouch"/multiple finger contacts). In some embodiments, touch input sub-module 324 detects contact on a touchpad.

Touch input sub-module 324 optionally detects a gesture input by a user. Different gestures on the touch-sensitive surface have different contact patterns. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an data mark). As another example, detecting a finger swipe gesture on the touch-sensitive surface includes detecting a finger-down event followed by detecting one or more finger-dragging events, and subsequently followed by detecting a finger-up (lift off) event.

Graphics sub-module 326 includes various known software components for rendering and displaying graphics on touch screen 102 or other display, including components for changing the visual impact (e.g., brightness, transparency, saturation, contrast or other visual property) of graphics that are displayed. As used herein, the term "graphics" includes any object that can be displayed to a user, including without limitation data visualizations, icons (such as user-interface objects including soft keys), text, digital images, animations and the like. In some embodiments, graphics sub-module 326 stores data representing graphics to be used. Each graphic is, optionally, assigned a corresponding code. Graphics sub-module 326 receives, from applications etc., one or more codes specifying graphics to be displayed along with, if necessary, coordinate data and other graphic property data, and then generates screen image data to output to the display or touch screen.

Applications 328 optionally include data visualization module 330 for displaying graphical views of data (e.g., in a chart) and one or more other applications. Examples of other applications that are, optionally, stored in memory 308 include other word processing applications, email applications, and presentation applications.

In conjunction with I/O interface 306, including touch screen 102, CPU(s) 302, and/or database(s) 332, data visualization module 330 includes executable instructions for displaying and manipulating various graphical views of data.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 308 optionally stores a subset of the modules and data structures identified above. Furthermore, memory 308 optionally stores additional modules and data structures not described above.

Figure 3B:
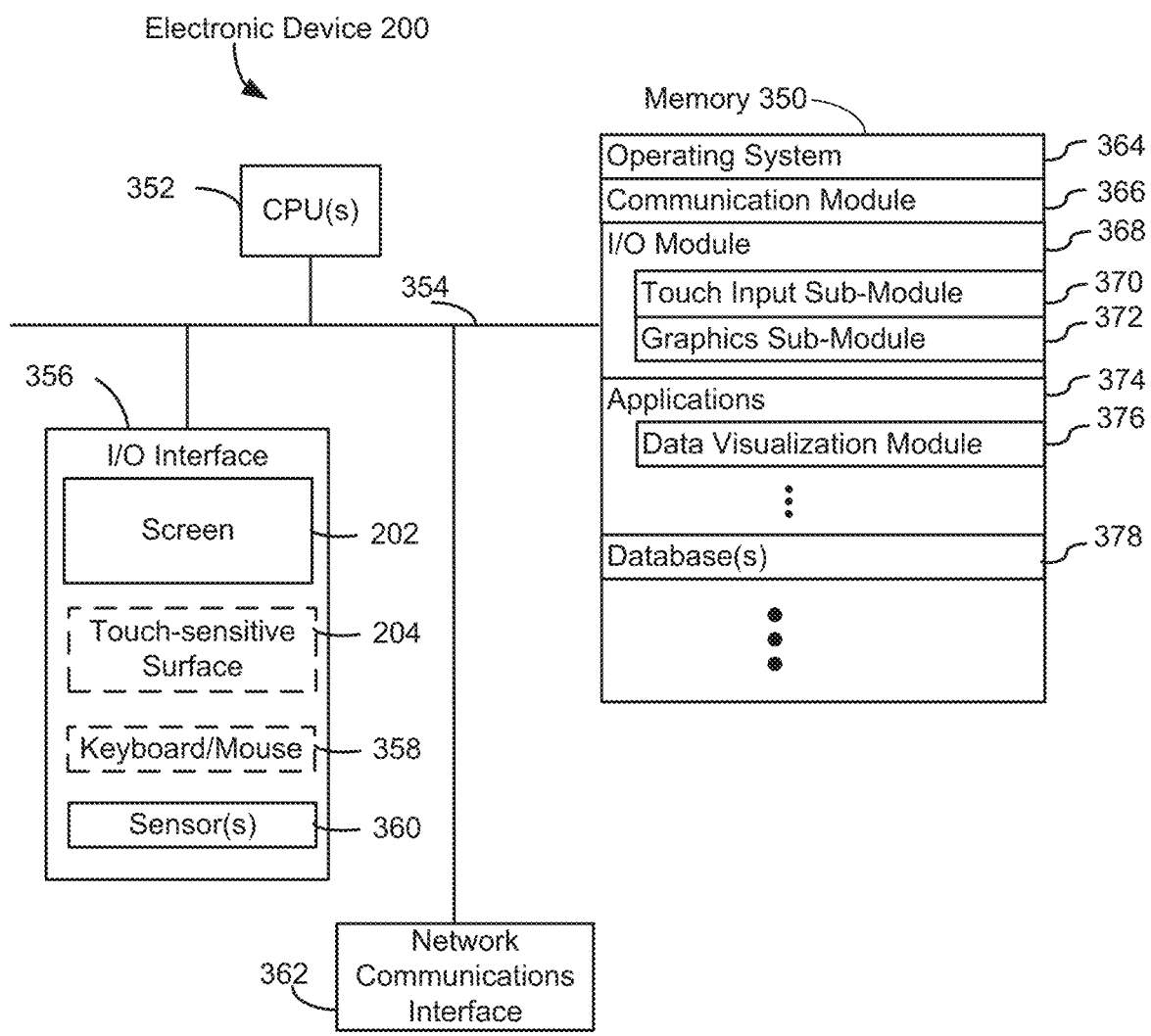
FIG. 3B is a block diagram illustrating an electronic device in accordance with some embodiments.

FIG. 3B is a block diagram illustrating electronic device 200 in accordance with some embodiments. It should be appreciated that device 200 is only one example of a electronic device, and that device 200 optionally has more or fewer components than shown, optionally combines two or more components, or optionally has a different configuration or arrangement of the components. The various components shown in FIG. 3B are implemented in hardware, software, or a combination of both hardware and software, including one or more signal processing and/or application specific integrated circuits.

Device 200 typically includes one or more processing units (CPU's) 352, one or more network or other communications interfaces 362, memory 350, I/O interface 356, and one or more communication buses 354 for interconnecting these components. Communication buses 354 optionally include circuitry (sometimes called a chipset) that interconnects and controls communications between system components.

I/O interface 306 comprises screen 202 (also sometimes called a display), touch-sensitive surface 204, and one or more sensor(s) 360 (e.g., optical, acceleration, proximity, and/or touch-sensitive sensors). I/O interface 356 optionally includes a keyboard and/or mouse (or other pointing device) 358. I/O interface 356 couples input/output peripherals on device 200, such as screen 202, touch-sensitive surface 204, other input devices 358, and one or more sensor(s) 360, to CPU(s) 352 and/or memory 350.

Screen 202 provides an output interface between the device and a user. Screen 202 displays visual output to the user. The visual output optionally includes graphics, text, icons, data marks, and any combination thereof (collectively termed "graphics"). In some embodiments, some or all of the visual output corresponds to user-interface objects. Screen 202 optionally uses LCD (liquid crystal display) technology, LPD (light emitting polymer display) technology, or LED (light emitting diode) technology, although other display technologies are used in other embodiments.

In some embodiments, device 200 includes touch-sensitive surface 204 (e.g., a touchpad) for detecting touch inputs. Touch-sensitive surface 204 accepts input from the user via touch inputs. For example, touch input 210 in FIG. 2. Touch-sensitive surface 204 (along with any associated modules and/or sets of instructions in memory 350) detects touch inputs and converts the detected inputs into interaction with user-interface objects (e.g., one or more icons, data marks, or images) that are displayed on screen 202. In an exemplary embodiment, a point of contact between touch-sensitive surface 204 and the user corresponds to a finger of the user.

Memory 350 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 350 optionally includes one or more storage devices remotely located from CPU(s) 352. In some embodiments, the software components stored in memory 350 include operating system 364, communication module 366, input/output (I/O) module 368, and applications 374. In some embodiments, one or more of the various modules comprises a set of instructions in memory 350. In some embodiments, memory 350 stores one or more data sets in one or more database(s) 378. In some embodiments, I/O module 368 includes touch input sub-module 370 and graphics sub-module 372. In some embodiments, applications 374 include data visualization module 376.

In some embodiments, memory 350 stores programs, modules, and data structures analogous to the programs, modules, and data structures stored in memory 308 of portable multifunction device 100 (FIG. 3A), or a subset thereof. Furthermore, memory 350 optionally stores additional programs, modules, and data structures not present in memory 308 of portable multifunction device 100. For example, memory 350 of device 200 optionally stores drawing, presentation, and word processing applications, while memory 308 of portable multifunction device 100 (FIG. 3A) optionally does not store these modules.

Device 200 also includes a power system for powering the various components. The power system optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Each of the above identified elements in FIG. 3B is, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 350 optionally stores a subset of the modules and data structures identified above. Furthermore, memory 350 optionally stores additional modules and data structures not described above.

Attention is now directed towards embodiments of user interfaces ("UI") and associated processes that are, optionally, implemented on device 100 or device 200. The following examples are shown using a mouse and cursor with a display. However, it should be understood that, in some embodiments, the inputs are detected on a touch-sensitive surface, such as a touch screen or trackpad, instead of using mouse-based inputs.

FIGS. 4A-4P illustrate exemplary user interfaces for selecting and displaying chart calculation options in accordance with some embodiments. The user interfaces in these figures are used to illustrate the processes described below, including the processes in FIGS. 5A-5C.

FIG. 4A shows a UI 402 that is displaying an exemplary chart 401 on display 202. The chart includes rows 414 (e.g., representing America, APAC, and EMEA regions), columns 446 (e.g., representing quarters), and columns 434 (e.g., representing months, which are sub-columns of columns 446). The chart includes visual marks 404 (e.g., bars) that represent calculated values derived from a set of data. In FIG. 4A, the visual marks 462 represent total sales for each month in each region.

Figure 4B:
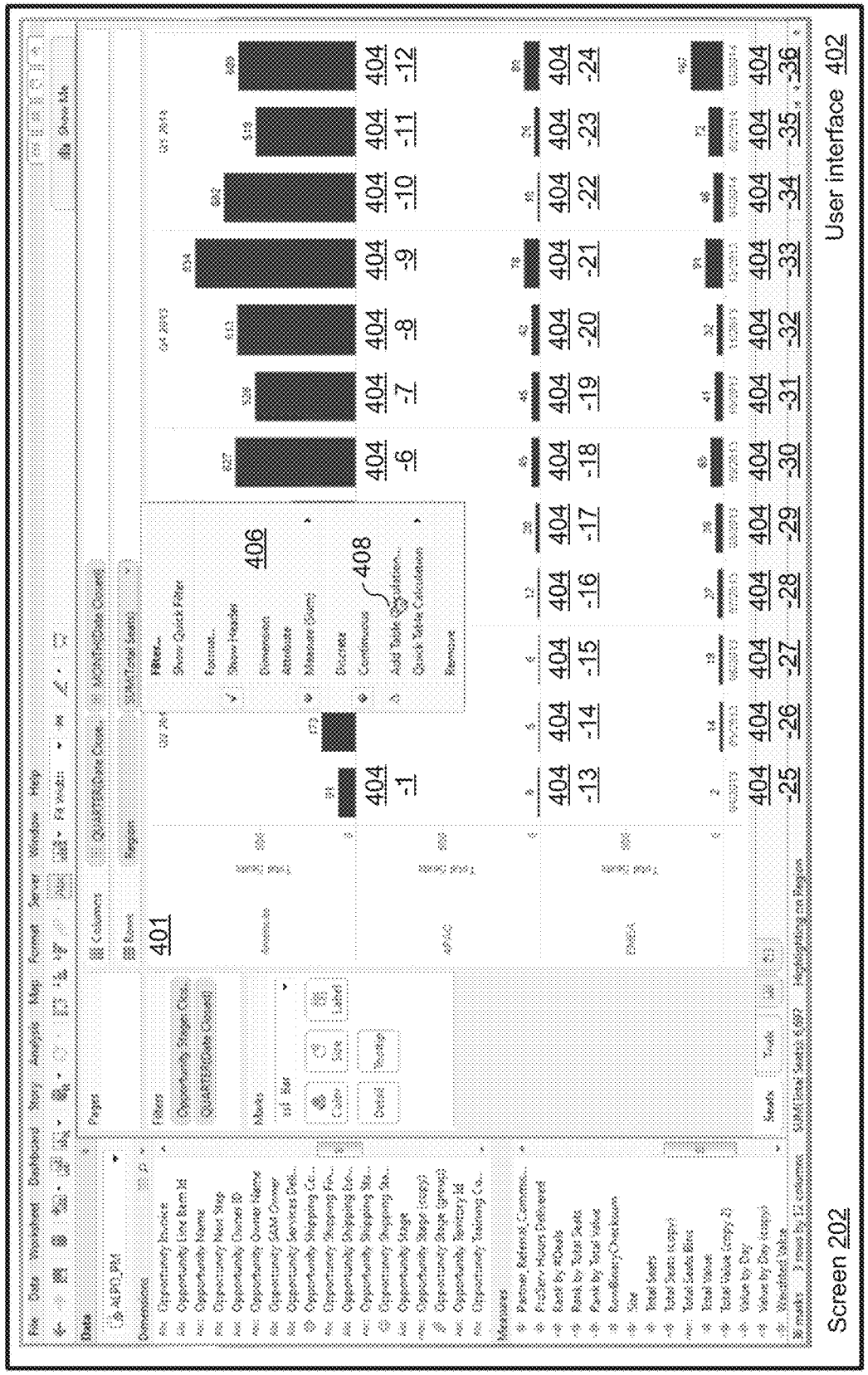

FIG. 4B shows a menu 406 added to UI 402 (e.g., by right-clicking on the SUM(Total Sales) icon). In menu 406, the Add Table Calculation icon 408 is being selected and activated (e.g. with a pointer and a mouse click).

Figure 4C:
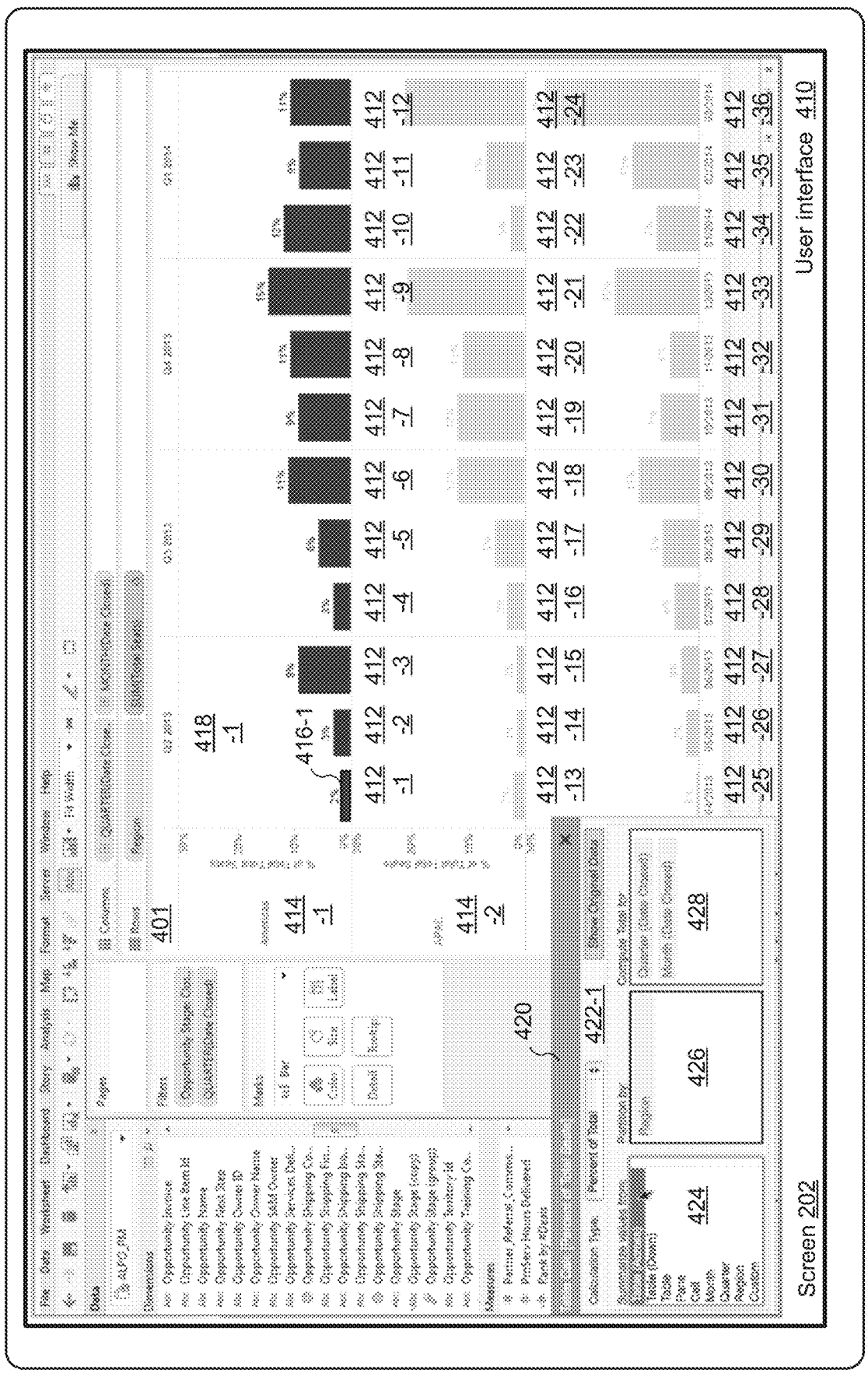

FIG. 4C shows a UI 410 that is displayed in response to activation of the Add Table Calculation icon 408. In UI 410, a chart-calculations-options area 420 (e.g., a window) is displayed that includes an option 422-1 for a type of calculation (e.g., percent of total). In UI 410, a single option for a type of calculation is displayed. In other embodiments, multiple options 422 for the type of calculation are concurrently displayed. Chart-calculations-options area 420 also displays one or more options for a type of data partitioning (for a selected type of calculation), such as the options 424 listed in the area labeled "Summarize values from." Chart-calculations-options area 420 optionally includes areas 426 and 428 that provide additional information on how the data in the chart is being partitioned and/or which totals are being computed. In some embodiments, the icons in areas 426 and 428 can be moved between areas 426 and 428 by a user (e.g., by dragging and dropping) to create a custom type of data partitioning for a selected type of calculation.

In FIG. 4C, in response to activation of the Add Table Calculation icon 408, the visual marks 404 (which correspond to total sales per month by region) are replaced by visual marks 412 at corresponding positions in the chart. Visual marks 412 represent, for given month in a given region, that month's percent of total sales for the region for the year.

In FIG. 4C, the interpretation of visual marks 412 is made clearer to a user by visually distinguishing some of visual marks 412 from the other visual marks in the chart. Visual marks in a first set of visual marks (namely 412-1 to 412-12) are visually distinguished from other visual marks in the chart (namely 412-13 to 412-36), by highlighting or otherwise visually emphasizing visual marks in the first set of marks and/or by dimming or otherwise visually deemphasizing the remaining visual marks in the chart that are not part of the first set of visual marks. For example, in FIG. 4C, visual marks 412-13 to 412-36 are dimmed, while visual marks 412-1 to 412-12 are not dimmed.

The first set of visual marks (412-1 to 412-12) includes a first visual mark (namely 412-1) at a first position in a first pane 418-1 that has a current focus 416-1 (shown by the bold black border around mark 412-1). In some embodiments, when the chart-calculations-options area is initially displayed, the current focus 416 is put on a visual mark at a default position in the chart, such as the top, leftmost position in the chart.

The first set of visual marks (412-1 to 412-12) corresponds to a first selected option for a type of calculation and a first selected option for a type of data partitioning (for a selected type of calculation). In FIG. 4C, the first selected option for a type of calculation is option 422-1, a "percent of total" calculation. In FIG. 4C, the first selected option 424 for a type of data partitioning (for a selected type of calculation) is "Table (across)," which corresponds to one row in the chart. By visually distinguishing the first set of visual marks (412-1 to 412-12) from other visual marks in the chart (412-13 to 412-36), the user is given a visual indication of what data is being used to calculate the values that correspond to visual marks 412. For example, visually distinguishing a single row of visual marks (412-1 to 412-12) informs a user that the "percent of total" calculation is for a total of 12 months in a single region. The percentages of the first set of visual marks (412-1 to 412-12) sum to 100%.

Figure 4D:
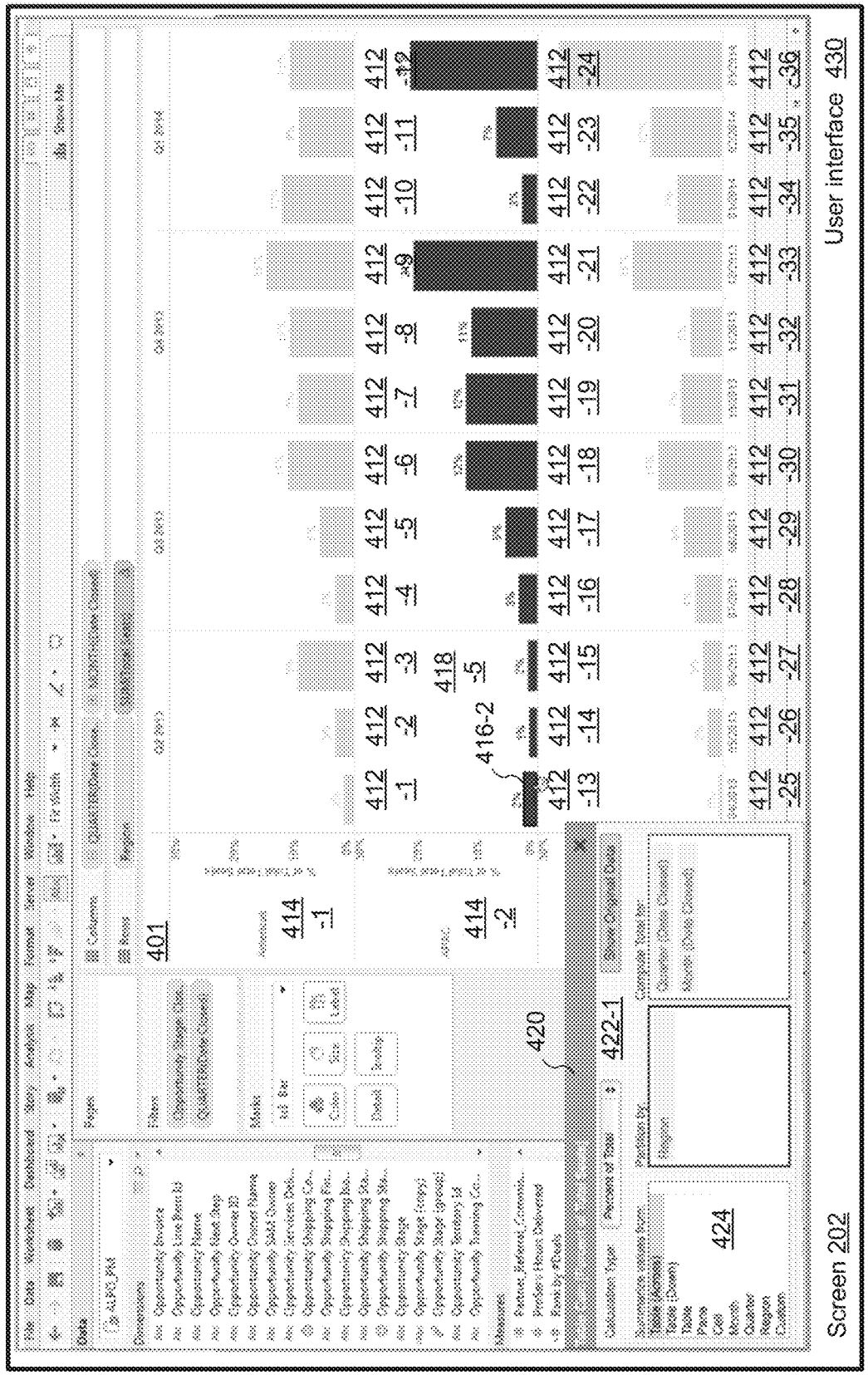

FIG. 4D shows a UI 430 that is displayed in response to detecting an input (e.g., a click on visual mark 412-13) that changes the current focus 416-2 to a second visual mark (e.g., visual mark 412-13) in a second pane (e.g., 418-5) in the chart. Visual marks in a third set of visual marks (namely 412-13 to 412-24) are visually distinguished from other visual marks in the chart (namely 412-1 to 412-12 and 412-25 to 412-36), by highlighting or otherwise visually emphasizing visual marks in the third set of marks and/or by dimming or otherwise visually deemphasizing the remaining visual marks in the chart that are not part of the third set of visual marks. For example, in FIG. 4D, visual marks 412-1 to 412-12 and 412-25 to 412-36 are dimmed, while visual marks 412-13 to 412-24 are not dimmed.

The third set of visual marks (412-13 to 412-24) is distinct from the first set of visual marks (412-1 to 412-12). The third set of visual marks includes the second visual mark (412-13) that has the current focus 416-2.

The third set of visual marks corresponds to the first selected option for a type of calculation (e.g., option 422-1, a "percent of total" calculation) and the first selected option for a type of data partitioning (for a selected type of calculation) (e.g., "Table (Across)," which corresponds to one row in the chart). These options are the same as for the first set of visual marks because the chart calculation options are the same. As for the first set of visual marks, by visually distinguishing the third set of visual marks (412-13 to 412-24) from other visual marks in the chart (412-1 to 412-12 and 412-25 to 412-36), the user is given a visual indication of what data is being used to calculate the values that correspond to visual marks 412. For example, visually distinguishing a single row of visual marks (412-13 to 412-24) informs a user that the "percent of total" calculation is for a total of 12 months in a single region. The percentages of the third set of visual marks (412-13 to 412-25) sum to 100%.

Figure 4E:
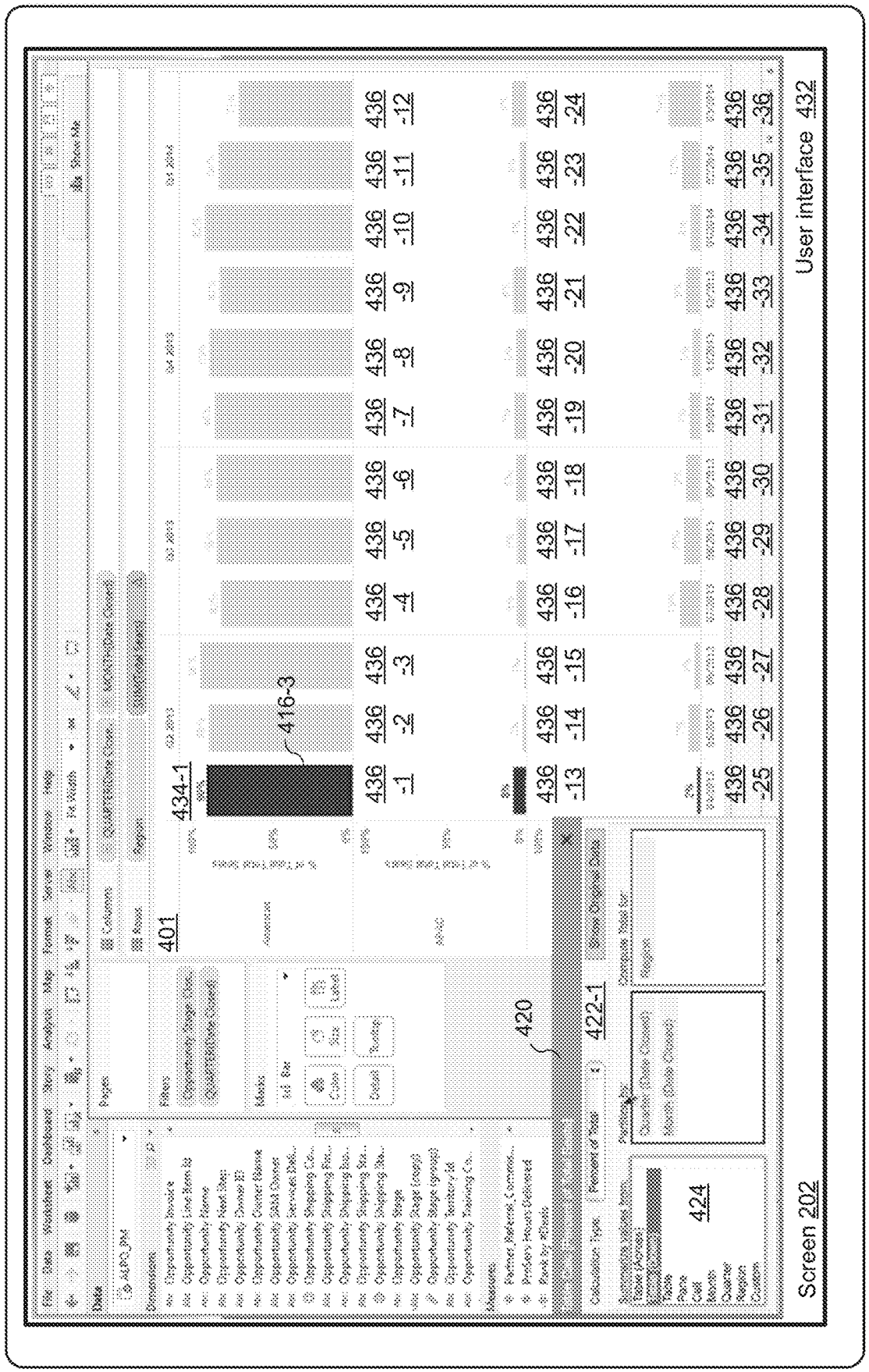

FIG. 4E shows a UI 432 that is displayed in response to detecting an input that selects a second option for a type of data partitioning (for a selected type of calculation) (e.g., a mouse click or finger tap gesture in the chart-calculations-options area 420 on an icon for a second option for a type of data partitioning, such as "Table(Down)," which corresponds to one column 434-1 in the chart).

Because a different option for a type of data partitioning has been selected, the chart is recalculated and visual marks 412 (FIG. 5D) are replaced by visual marks 436. Visual marks in a second set of visual marks (namely 436-1, 436-13, and 436-25) are visually distinguished from other visual marks in the chart (namely 436-2 to 436-12, 436-14 to 436-24, and 436-26 to 436-36), by highlighting or otherwise visually emphasizing visual marks in the second set of marks and/or by dimming or otherwise visually deemphasizing the remaining visual marks in the chart that are not part of the second set of visual marks. For example, in FIG. 4E, visual marks 436-2 to 436-12, 436-14 to 436-24, and 436-26 to 436-36 are dimmed, while visual marks 436-1, 436-13, and 436-25 are not dimmed.

The second set of visual marks (436-1, 436-13, and 436-25) is distinct from the first set of visual marks (412-1 to 412-12).

The second set of visual marks includes a visual mark (436-1) at the first position in the first pane 418-1, which was previously the location of visual mark 412-1 in the first set of visual marks. Visual mark 436-1 has a current focus 416-3 (shown by the bold black border around mark 436-1). In some embodiments, when the chart calculation options change, the set of visual marks that are visually distinguished from the other visual marks in the chart includes a visual mark at the position in the chart that had current focus 416 immediately prior to changing the chart calculation options. In some embodiments, when the chart calculation options change, the current focus 416 is put on a visual mark at a default position in the chart, such as the top, leftmost position in the chart.

The second set of visual marks (436-1, 436-13, and 436-25) corresponds to the first selected option for a type of calculation and the second selected option for a type of data partitioning (for a selected type of calculation). In FIG. 4E, the first selected option for a type of calculation is option 422-1, a "percent of total" calculation. In FIG. 4E, the second selected option 424 for a type of data partitioning (for a selected type of calculation) is "Table (Down)," which corresponds to one column 434 in the chart. By visually distinguishing the second set of visual marks (436-1, 436-13, and 436-25) from other visual marks in the chart (436-2 to 436-12, 436-14 to 436-24, and 436-26 to 436-36), the user is given a visual indication of what data is being used to calculate the values that correspond to visual marks 412. For example, visually distinguishing a single column of visual marks (436-1, 436-13, and 436-25) informs a user that the "percent of total" calculation is for a total of 1 month across three regions. The percentages of the second set of visual marks (436-1, 436-13, and 436-25) sum to 100%.

Figure 4F:
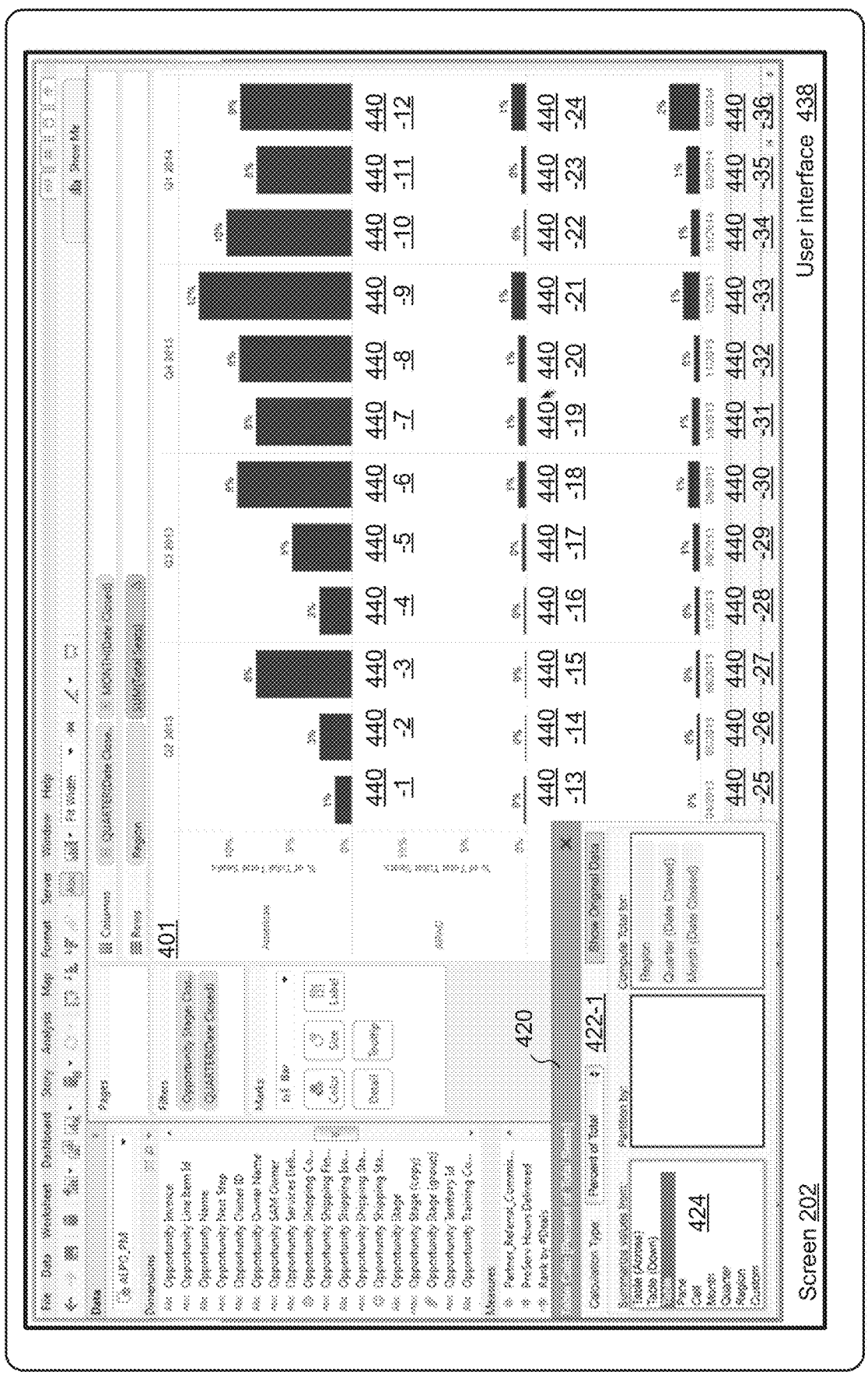

FIG. 4F shows a UI 438 that is displayed in response to detecting an input that selects another option for a type of data partitioning (for a selected type of calculation) (e.g., a mouse click or finger tap gesture in the chart-calculations-options area 420 on an icon for another option for a type of data partitioning, such as "Table," which corresponds to the entire chart).

Because a different option for a type of data partitioning has been selected, the chart is recalculated and visual marks 412 (FIG. 5C) are replaced by visual marks 440. The percentages of visual marks 440 sum to 100% because the "percent of total" calculation is for the entire chart.

Figure 4G:
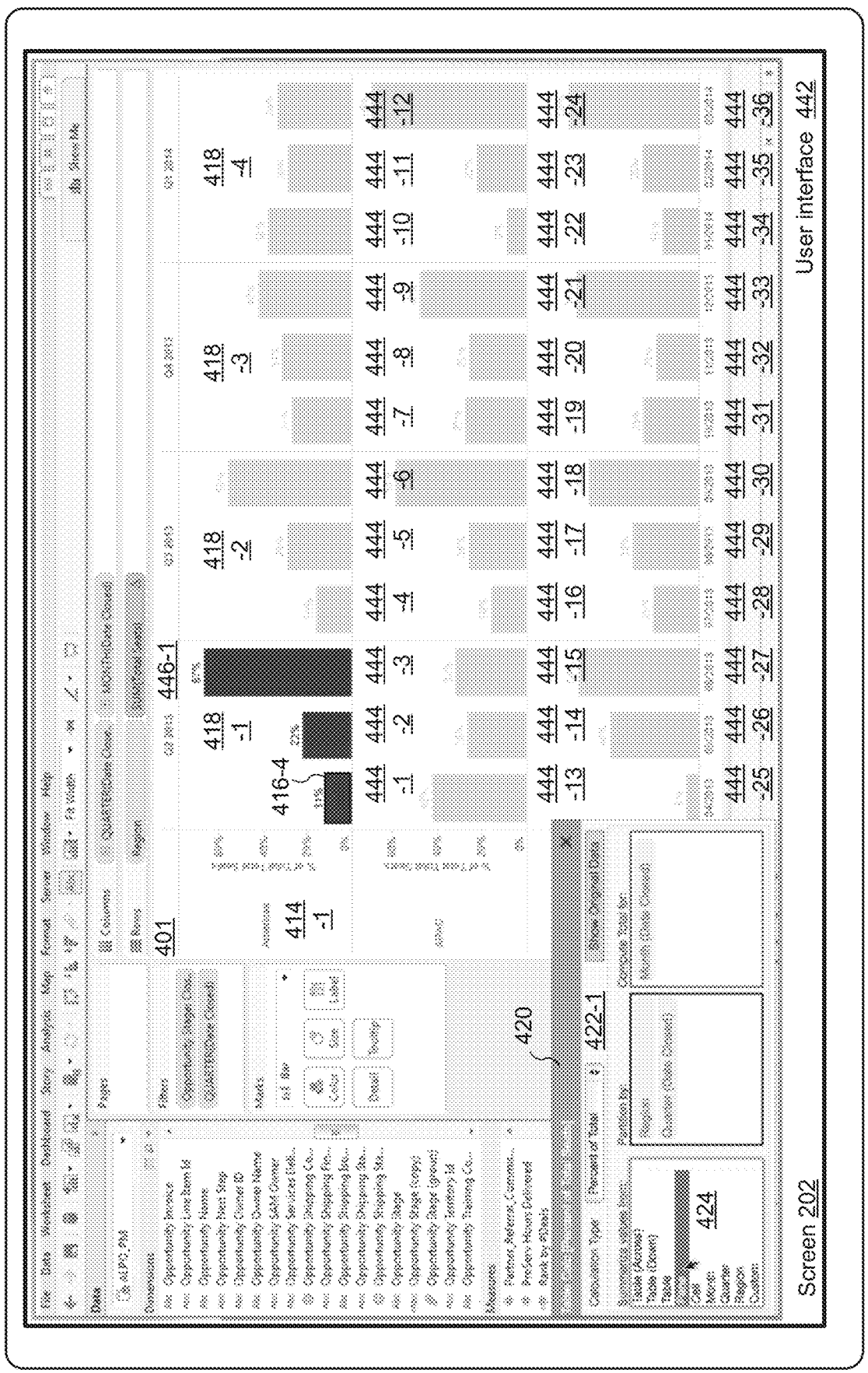

FIG. 4G shows a UI 442 that is displayed in response to detecting an input that selects another option for a type of data partitioning (for a selected type of calculation) (e.g., a mouse click or finger tap gesture in the chart-calculations-options area 420 on an icon for another option for a type of data partitioning, such as "Pane," which corresponds to one pane 418-1 in the chart).

Because a different option for a type of data partitioning has been selected, the chart is recalculated and visual marks 412 (FIG. 5C) are replaced by visual marks 444. Visual marks in a set of visual marks (namely 444-1, 444-2, and 444-3) are visually distinguished from other visual marks in the chart (namely 444-4 to 444-36), by highlighting or otherwise visually emphasizing visual marks in the set of marks and/or by dimming or otherwise visually deemphasizing the remaining visual marks in the chart that are not part of the set of visual marks. For example, in FIG. 4G, visual marks 444-4 to 444-36 are dimmed, while visual marks 444-1 to 444-3 are not dimmed.

The set of visual marks (444-1 to 444-3) is distinct from the first set of visual marks (412-1 to 412-12).

The set of visual marks includes a visual mark (444-1) at the first position in the first pane 418-1, which was previously the location of visual mark 412-1 in the first set of visual marks. Visual mark 444-1 has a current focus 416-4 (shown by the bold black border around mark 444-1). In some embodiments, when the chart calculation options change, the set of visual marks that are visually distinguished from the other visual marks in the chart includes a visual mark at the position in the chart that had current focus 416 immediately prior to changing the chart calculation options. In some embodiments, when the chart calculation options change, the current focus 416 is put on a visual mark at a default position in the chart, such as the top, leftmost position in the chart.

The set of visual marks (444-1 to 444-3) corresponds to the first selected option for a type of calculation and a second selected option for a type of data partitioning (for a selected type of calculation). In FIG. 4G, the first selected option for a type of calculation is option 422-1, a "percent of total" calculation. In FIG. 4G, the second selected option 424 for a type of data partitioning (for a selected type of calculation) is "Pane," which corresponds to one pane 418 in the chart. By visually distinguishing the set of visual marks (444-1 to 444-3) from other visual marks in the chart (444-4 to 444-36), the user is given a visual indication of what data is being used to calculate the values that correspond to visual marks 444. For example, visually distinguishing a single pane of visual marks (444-1 to 444-3) informs a user that the "percent of total" calculation is for a total of 1 quarter across 1 region. The percentages of the set of visual marks (444-1 to 444-3) sum to 100%.

Figure 4H:
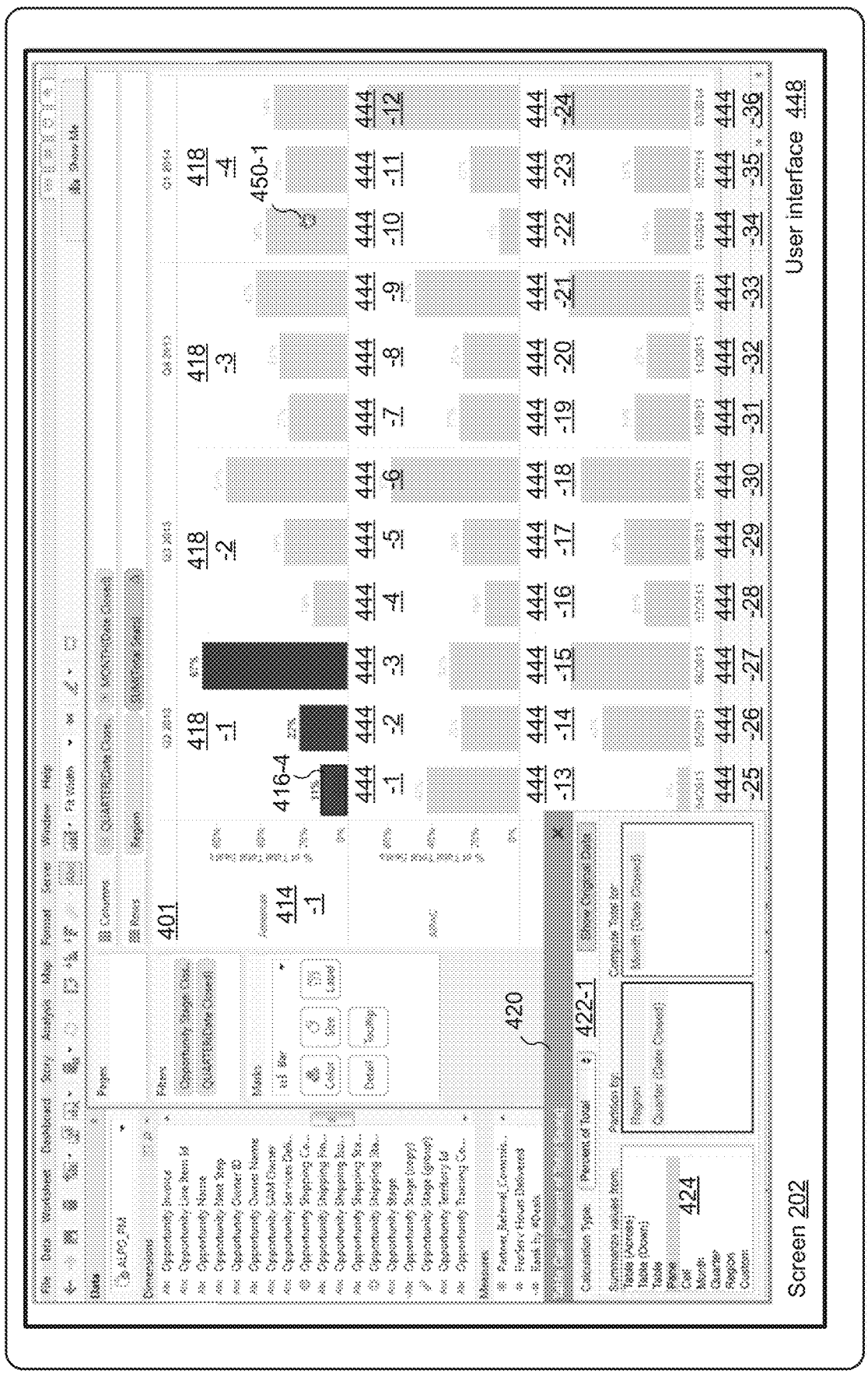

FIG. 4H shows a UI 448 that is the same as UI 442 (FIG. 4G), except the cursor/pointer 450-1 has been moved to visual mark 444-10.

Figure 4I:
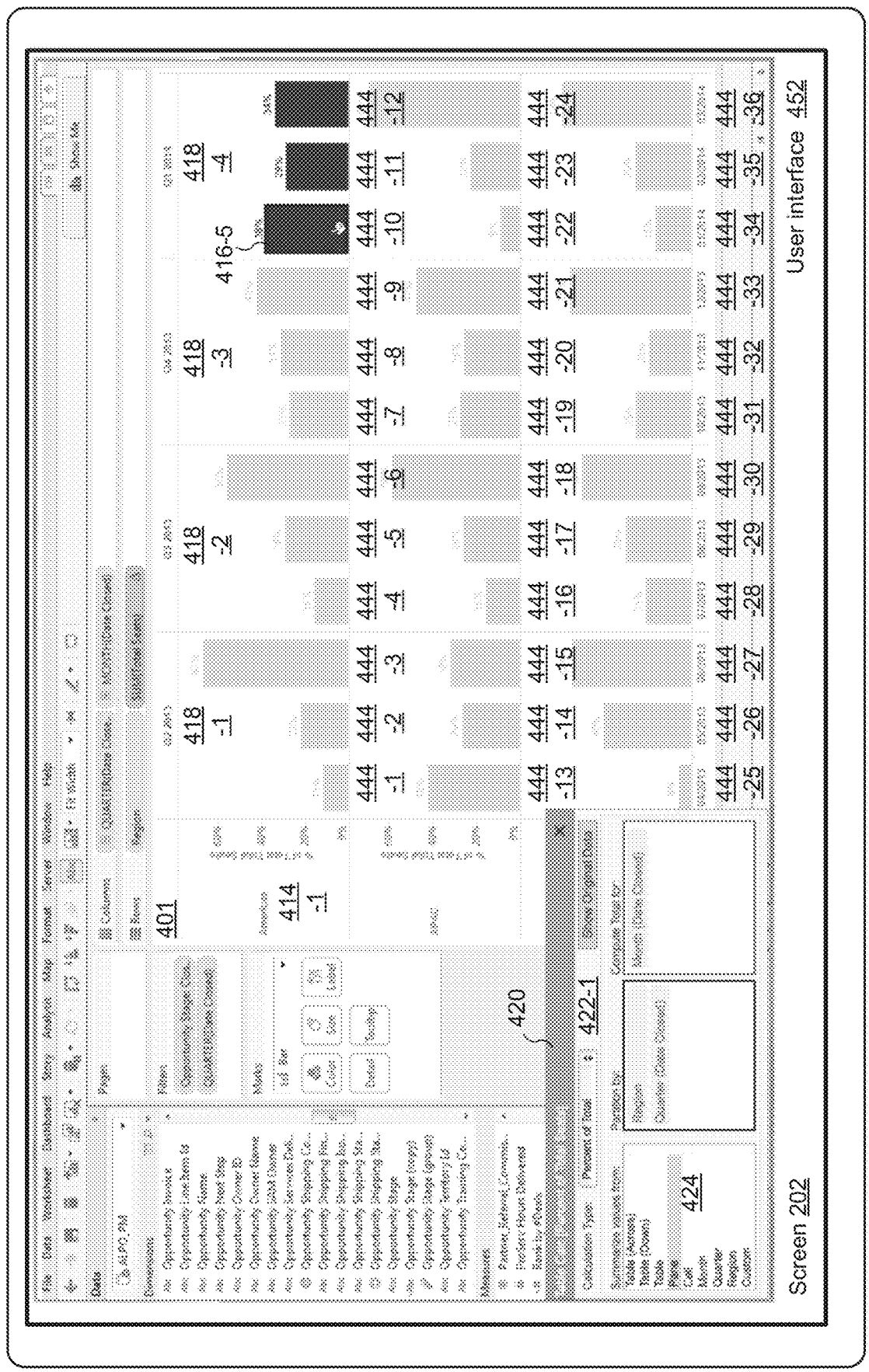

FIG. 4I shows a UI 452 that is displayed in response to detecting an input (e.g., a click on visual mark 444-10) that changes the current focus 416-5 to a visual mark (e.g., visual mark 444-10) in a second pane (e.g., 418-4) in the chart.

Visual marks in a set of visual marks (namely 444-10 to 444-12) are visually distinguished from other visual marks in the chart (namely 444-1 to 444-9 and 444-13 to 444-36), by highlighting or otherwise visually emphasizing visual marks in the set of marks and/or by dimming or otherwise visually deemphasizing the remaining visual marks in the chart that are not part of the set of visual marks. For example, in FIG. 4I, visual marks 444-1 to 444-9 and 444-13 to 444-36 are dimmed, while visual marks 444-10 to 444-12 are not dimmed.

The set of visual marks (444-10 to 444-12) is distinct from the first set of visual marks (412-1 to 412-12). The set of visual marks includes the visual mark (444-10) that has the current focus 416-5.

The set of visual marks corresponds to the first selected option for a type of calculation (e.g., option 422-1, a "percent of total" calculation) and a second selected option for a type of data partitioning (for a selected type of calculation) (e.g., "Pane," which corresponds to one pane in the chart). These options are the same as for visual marks in FIG. 4G because the chart calculation options are the same. As for the set of visual marks (444-1 to 444-3), by visually distinguishing the set of visual marks (444-10 to 444-12) from other visual marks in the chart (444-1 to 444-9 and 444-13 to 444-36), the user is given a visual indication of what data is being used to calculate the values that correspond to visual marks 444. For example, visually distinguishing a single pane of visual marks (444-10 to 444-12) informs a user that the "percent of total" calculation is for a total of 1 quarter across 1 region. The percentages of the set of visual marks (444-10 to 444-12) sum to 100%.

Figure 4J:
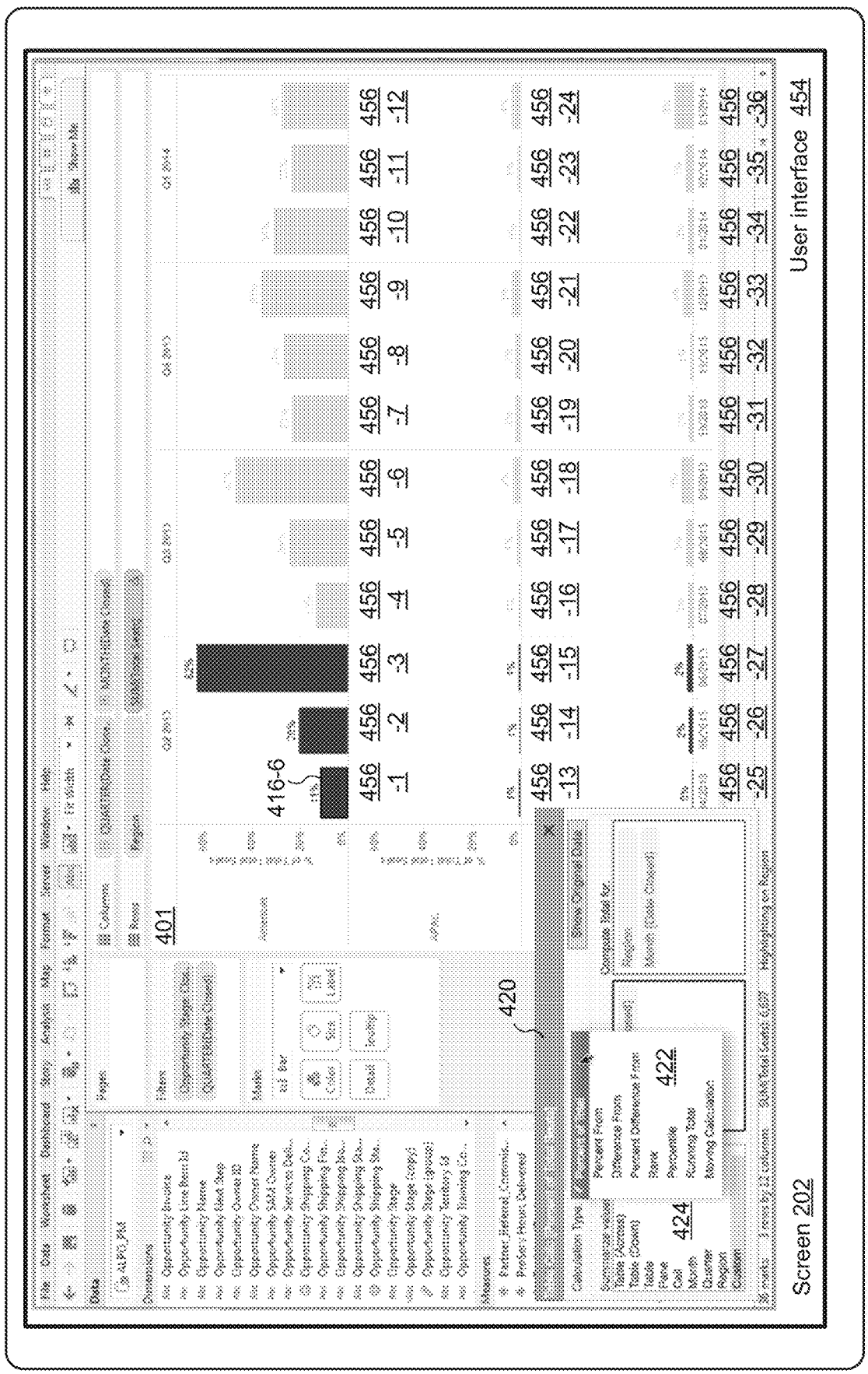
Figure 4K:
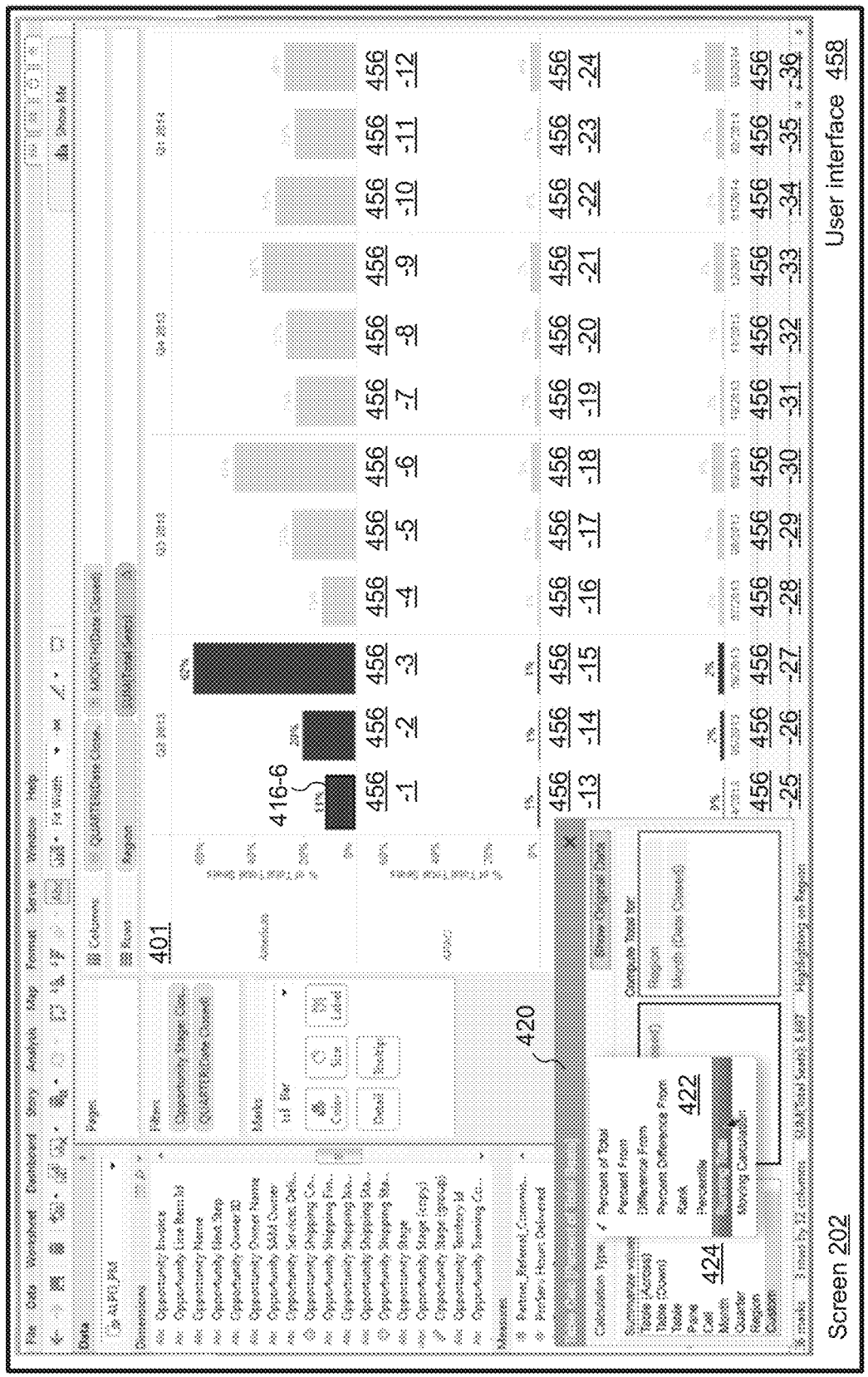

FIGS. 4J (with UI 454) and 4K (with UI 458) show an exemplary way to change an option for a type of calculation 422 from a first option (e.g., a "Percent of Total" calculation) to a second option (e.g., a "Running Total" calculation) by clicking on option 422-1, displaying a menu with multiple options 422, and selecting "Running Total" option 442-2.

Figure 4L:
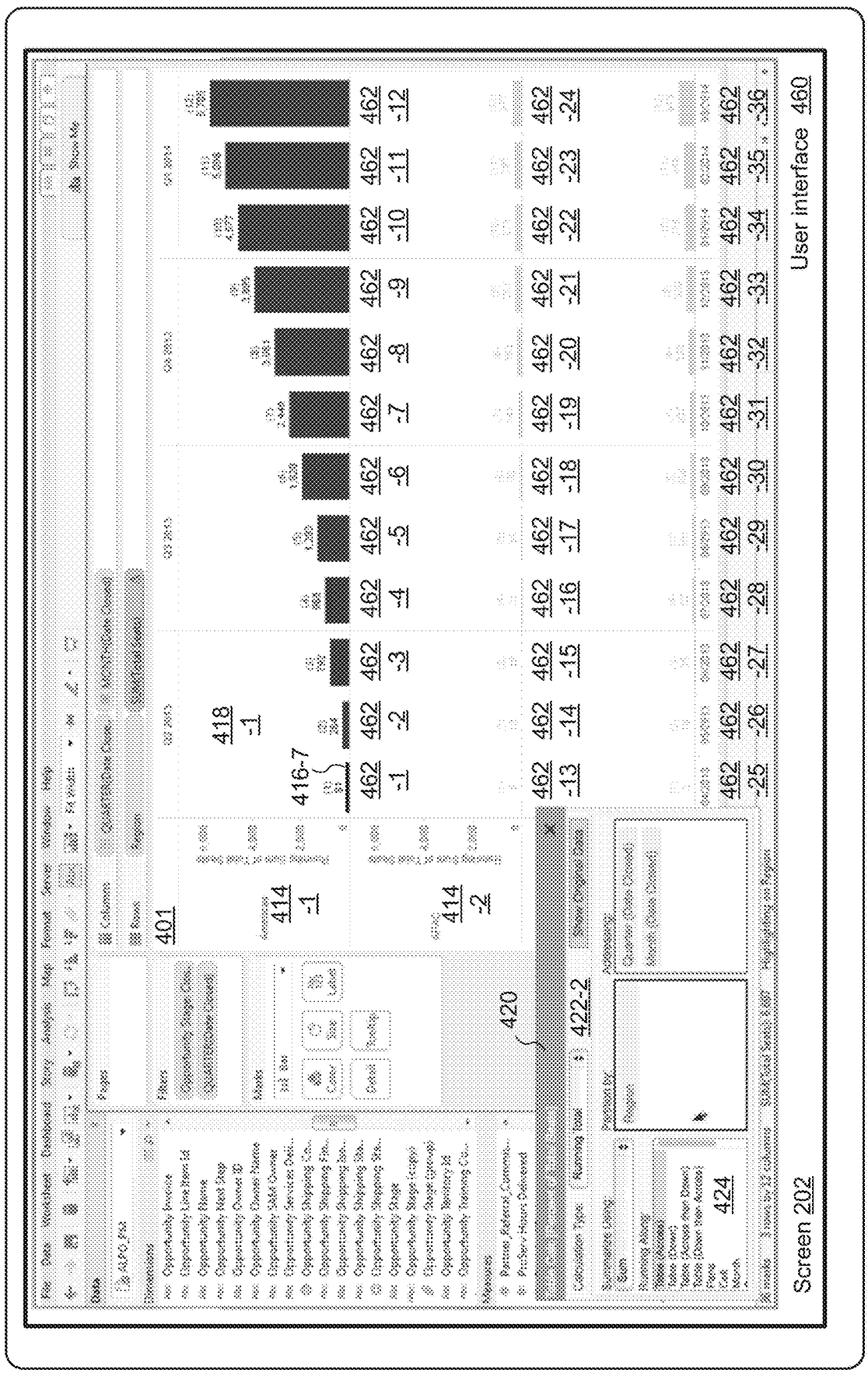

FIG. 4L shows a UI 460 that is displayed detecting an input that selects a second option for a type of calculation (e.g., a mouse click or finger tap gesture in the chart-calculations-options area on an icon for the second option for a type of calculation, such as "Running Total")

Because a different option for a type of calculation has been selected, the chart is recalculated and visual marks 462 are displayed in place of the previously displayed visual marks (e.g., in place of marks 456 in FIG. 4K or, similarly, in place marks 412 in FIG. 4C). Visual marks in a fourth set of visual marks (namely, 462-1 to 462-12) are visually distinguished from other visual marks in the chart (namely 462-13 to 462-36), by highlighting or otherwise visually emphasizing visual marks in the fourth set of marks and/or by dimming or otherwise visually deemphasizing the remaining visual marks in the chart that are not part of the fourth set of visual marks. For example, in FIG. 4L, visual marks 462-13 to 462-36 are dimmed, while visual marks 462-1 to 462-12 are not dimmed.

The fourth set of visual marks (462-1 to 462-12) is distinct from the first set of visual marks (412-1 to 412-12).

The fourth set of visual marks includes a visual mark (462-1) at the first position in the first pane 418-1, which was previously the location of visual mark 412-1 in the first set of visual marks. Visual mark 462-1 has a current focus 416-7 (shown by the bold black border around mark 462-1). In some embodiments, when the chart calculation options change, the set of visual marks that are visually distinguished from the other visual marks in the chart includes a visual mark at the position in the chart that had current focus 416 immediately prior to changing the chart calculation options. In some embodiments, when the chart calculation options change, the current focus 416 is put on a visual mark at a default position in the chart, such as the top, leftmost position in the chart.

The fourth set of visual marks (462-1 to 462-12) corresponds to the second selected option for a type of calculation and a selected option for a type of data partitioning (for a selected type of calculation, such as the first selected option for a type of data partitioning). In FIG. 4L, the second selected option for a type of calculation is option 422-2, a "running total" calculation. In FIG. 4L, a selected option 424 for a type of data partitioning (for a "running total" calculation) is "Table (Across)," which corresponds to one row 414 in the chart. By visually distinguishing the fourth set of visual marks (462-1 to 462-12) from other visual marks in the chart (462-13 to 462-36), the user is given a visual indication of what data is being used to calculate the values that correspond to visual marks 462. For example, visually distinguishing a single row of visual marks (462-1 to 462-12) informs a user that the "running total" calculation is for a total of 12 months across 1 region. In some embodiments, when a selected type of calculation is a running total, a respective numerical value for a respective visual mark in the running total is displayed with the respective visual mark (e.g., adjacent to the respective visual mark or within the respective visual mark). For example, visual marks 462-1 to 462-12 have numerical values 1 to 12 in parentheses just above the running total.

Figure 4M:
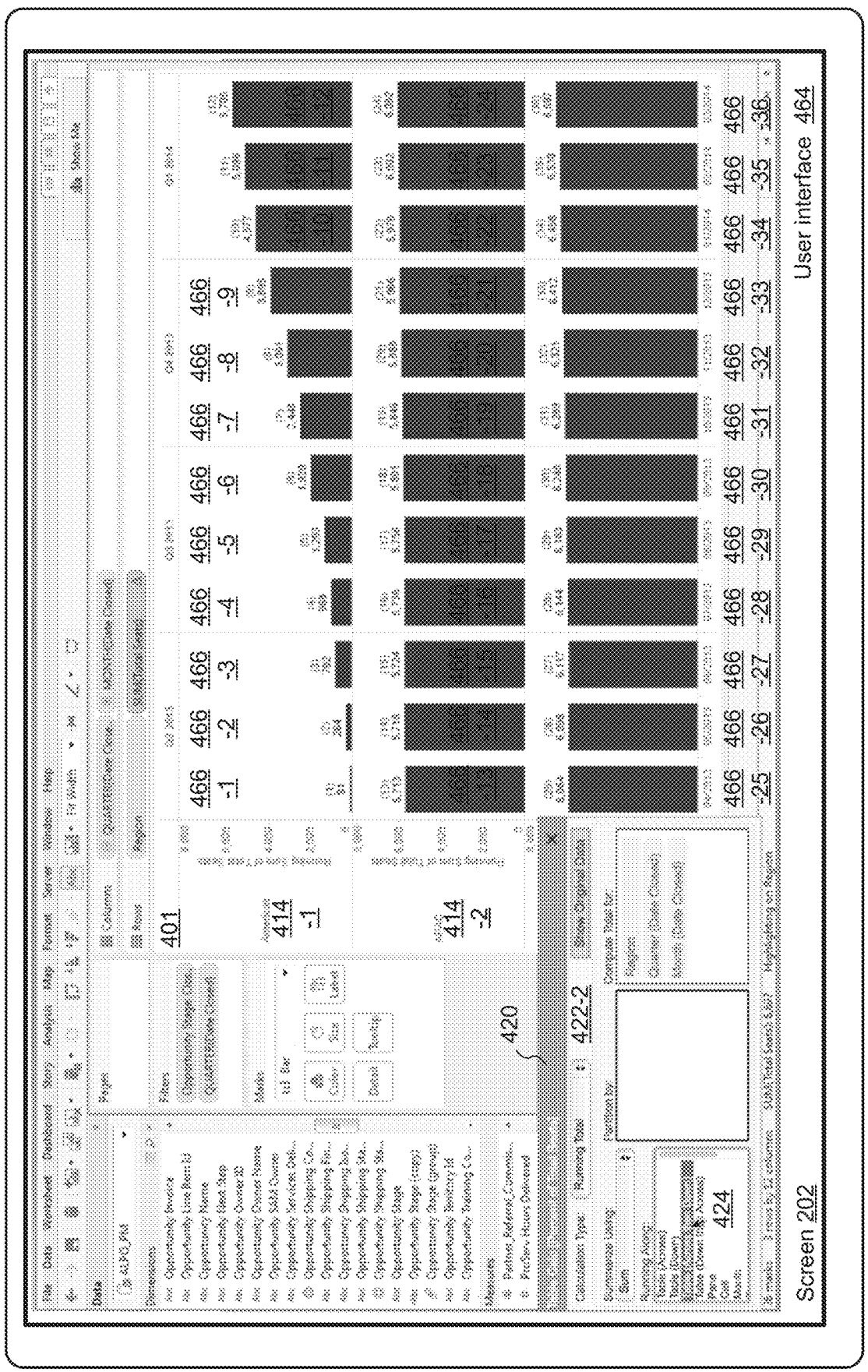

FIG. 4M shows a UI 464 for when the running total is over all the visual marks 466 and the running total calculation corresponds to calculated values progressing left-to-right, then top-to-bottom in the chart.

Figure 4N:
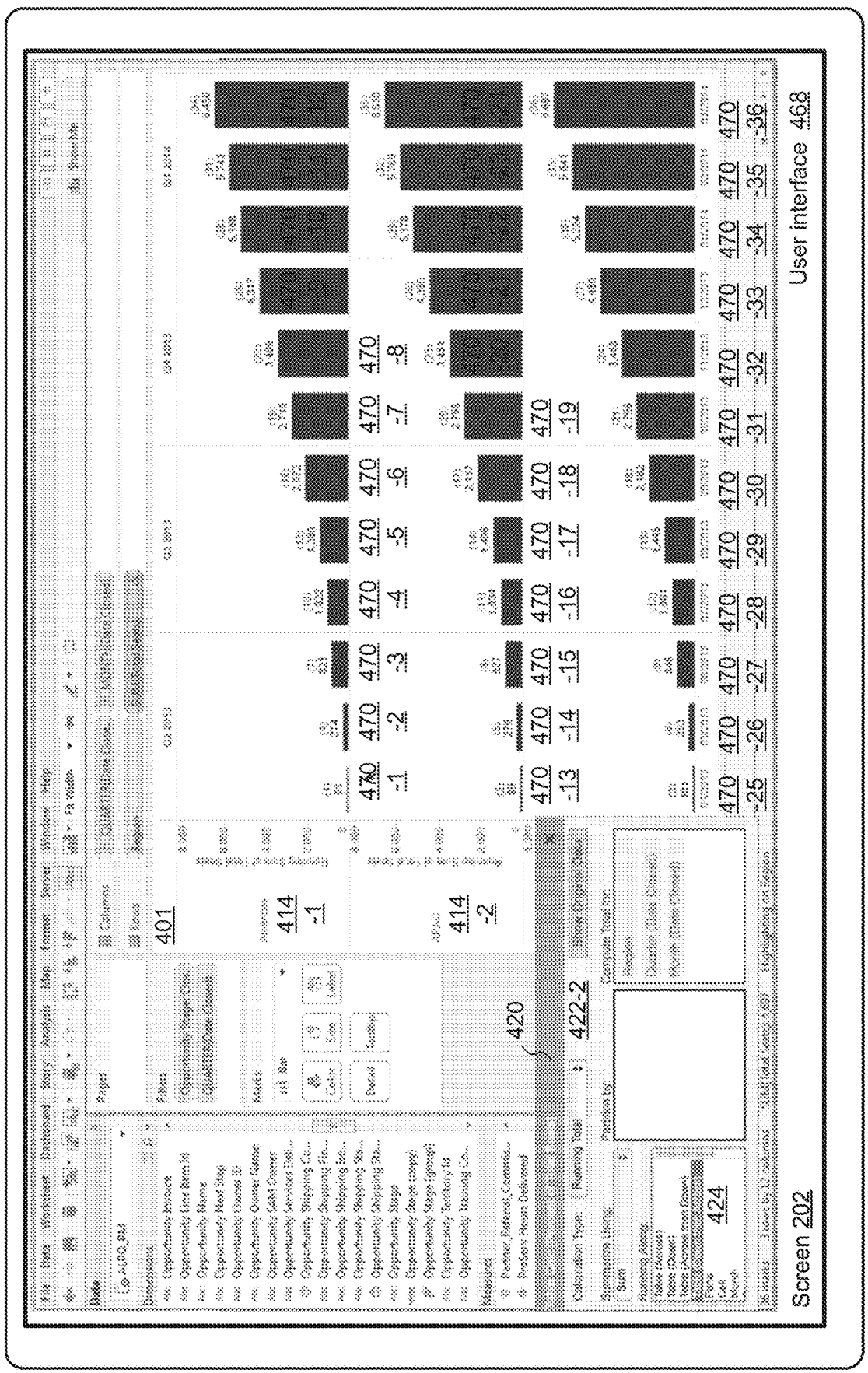

FIG. 4N shows a UI 468 for when the running total is over all the visual marks 470 and the running total calculation corresponds to calculated values progressing top-to-bottom, then left-to-right in the chart.

Figure 4O:
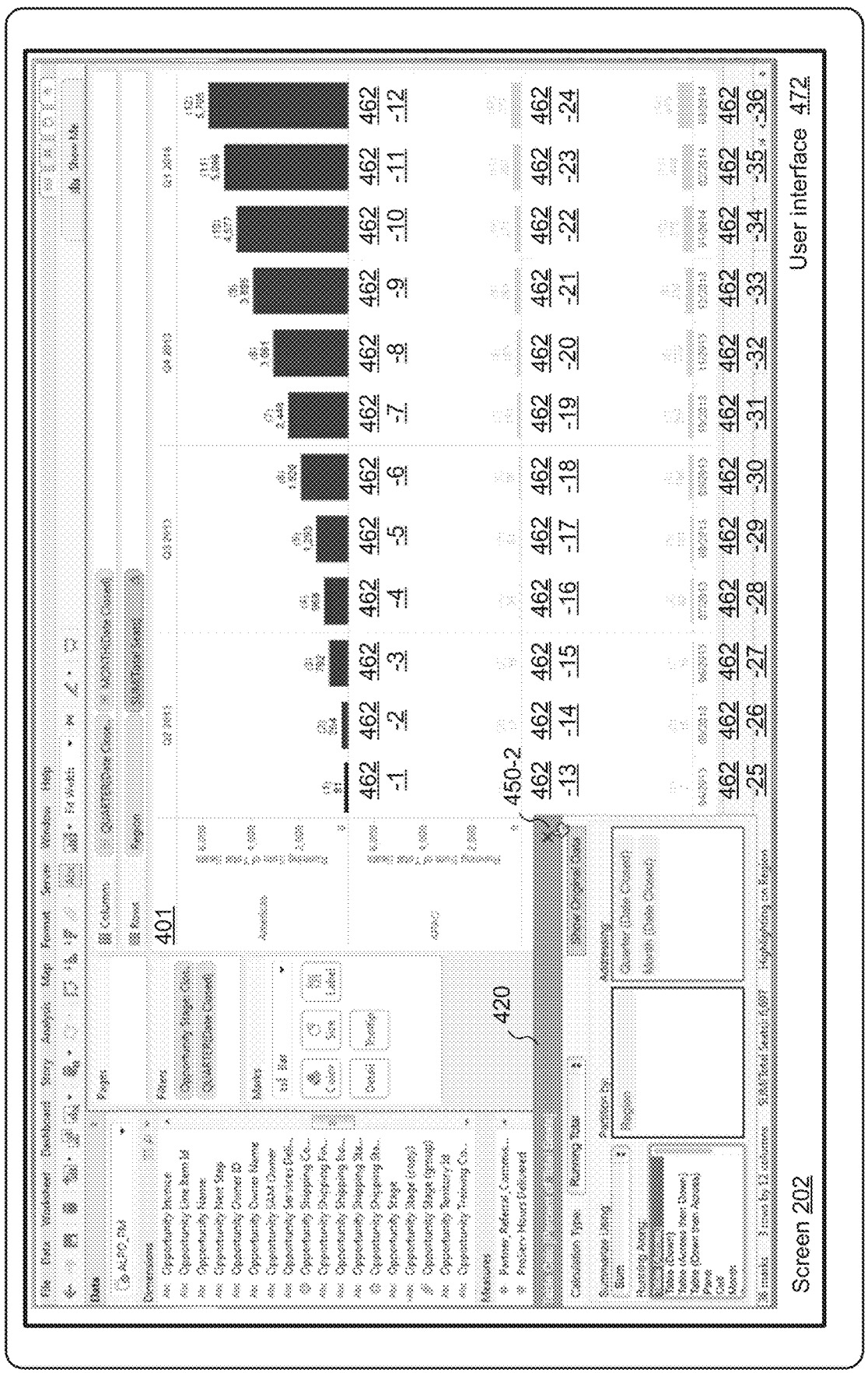

FIG. 4O shows a UI 472 with a set of visual marks visually distinguished from other visual marks in the chart (e.g., visual marks 462-1 to 462-12 are visually distinguished from visual marks 462-13 to 462-13). Pointer/cursor is placed over an icon to close the chart-calculations-options area 420.

FIG. 4P shows a UI 474 that is displayed in response to detecting an input (e.g., a mouse click or finger tap gesture on the icon to close the chart-calculations-options area 420). Display of the chart-calculations-options area 420 ceases and visual marks in the set of visual marks (462-1 to 462-12) are no longer visually distinguished from other visual marks in the chart. Similarly, for any other set of visually distinguished marks described above, such as visual marks 412-1 to 412-12 in FIG. 5C, visual marks in the set of visual marks are no longer visually distinguished from other visual marks in the chart when the chart-calculations-options area 420 ceases to be displayed.

Attention is now directed towards methods that are, optionally, implemented on portable electronic device 100 or electronic device 200.

FIGS. 5A-5C are flow diagrams illustrating a method 500 of selecting and displaying chart calculation options in accordance with some embodiments. As indicated in the flow diagrams with dotted outlines, some of the features are optional. Implementations include various combinations of these optional features.

Method 500 is performed at an electronic device (e.g., portable electronic device 100, FIG. 1, or electronic device 200, FIG. 2) with a display. In some embodiments, method 500 is governed by instructions that are stored in a non-transitory computer readable storage medium and that are executed by one or more processors of a device, such as the one or more processors 302 of portable electronic device 100 and/or the one or more processors 352 of electronic device 200, as shown in FIGS. 3A-3B. Some operations in method 500 are, optionally, combined and/or the order of some operations is, optionally, changed.

The device displays (502) a chart on the display (e.g., chart 401). The chart includes visual marks (e.g., bars in a bar chart, or other graphics) that represent calculated values derived from a set of data (e.g., visual marks 412, FIG. 4C). The chart includes a plurality of rows (e.g., rows 414) and a plurality of columns (e.g., columns 446 and/or 434). The chart includes a plurality of panes formed by intersection of the plurality of rows and the plurality of columns (e.g., panes 418). A current focus is on a first visual mark at a first position in a first pane in the plurality of panes. For example, in FIG. 5C, current focus 416-1 is on a first visual mark 412-1 at a first position in a first pane 418-1.

In some embodiments, a respective pane in the plurality of panes includes (504) a plurality of visual marks. For example, panes 418 include three visual marks per pane.

In some embodiments, a respective pane in the plurality of panes includes (506) a plurality of visual marks, with each visual mark in the plurality of visual marks corresponding to a sub-column within the respective pane. For example, in FIG. 4A, visual mark 404-1 corresponds to sub-column 434-1, visual mark 404-2 corresponds to sub-column 434-2, and visual mark 404-3 corresponds to sub-column 434-3.

In some embodiments, a respective pane in the plurality of panes includes (508) a plurality of visual marks, with each visual mark in the plurality of visual marks corresponding to a sub-row within the respective pane (not shown).

The device concurrently displays (510) a chart-calculations-options area with the chart on the display (e.g., area 420, FIG. 4C). The chart-calculations-options area includes display of one or more options (e.g., options 422, FIGS. 4C and 4J) for a type of calculation (e.g., percent of total, percent from, difference from, percent difference from, rank, percentile, running total, and/or moving calculation) and one or more options (e.g., options 424, FIG. 5C) for a type of data partitioning (for a selected type of calculation).

Exemplary options for the type of data partitioning include: perform the selected type of calculation on data that corresponds to each row in the chart (the "Table(Across)" option 424 in FIG. 4C); perform the selected type of calculation on data that corresponds to each column in the chart (the "Table(Down)" option 424 in FIG. 4E); perform the selected type of calculation on data that corresponds to the entire chart (the "Table" option 424 in FIG. 4F); perform the selected type of calculation on data that corresponds to each pane in the chart (the "Pane" option 424 in FIG. 4G); perform the selected type of calculation on data that corresponds to calculated values progressing left-to-right, then top-to-bottom in the chart (the "Table(Across then Down" option 424 in FIG. 4M); and perform the selected type of calculation on data that corresponds to calculated values progressing top-to-bottom, then left-to-right in the chart (the "Table(Down then Across" option 424 in FIG. 4N).

In some embodiments, the options for a type of data partitioning include (512) performing a selected type of calculation on data that corresponds to each row in the chart, performing a selected type of calculation on data that corresponds to each column in the chart, performing a selected type of calculation on data that corresponds to the entire chart, performing a selected type of calculation on data that corresponds to each pane in the chart, performing a selected type of calculation on data that corresponds to calculated values progressing left-to-right, then top-to-bottom in the chart, and/or performing a selected type of calculation on data that corresponds to calculated values progressing top-to-bottom, then left-to-right in the chart.

Visual marks in a first set of visual marks (e.g., visual marks 412-1 to 412-12, FIG. 5C) are (514) visually distinguished from other visual marks in the chart (e.g., by highlighting or otherwise visually emphasizing visual marks in the first set of marks and/or by dimming or otherwise visually deemphasizing the remaining visual marks in the chart that are not part of the first set of visual marks). The first set of visual marks includes the first visual mark (e.g., visual mark 412-1, FIG. 5C). The first set of visual marks corresponds to a first selected option (e.g., option 422-1) for a type of calculation and a first selected option (e.g., option 424, such as "Table(Across)" in FIG. 4C) for a type of data partitioning (for a selected type of calculation).

In some embodiments, when a selected type of calculation is a running total, a respective numerical value for a respective visual mark in the running total is (516) displayed with the respective visual mark (e.g., adjacent to the respective visual mark or within the respective visual mark), as shown for the running totals in FIGS. 4L-4N.

In some embodiments, the device detects (518) an input that selects a second option for a type of data partitioning (for a selected type of calculation) (e.g., a mouse click or finger tap gesture in the chart-calculations-options area on an icon 424 for the second option for a type of data partitioning, such as a click on "Table(Down)," which corresponds to one column 434-1 in the chart), distinct from the first option for a type of data partitioning (for a selected type of calculation).

In some embodiments, in response to detecting the input that selects the second option for a type of data partitioning (for a selected type of calculation), the device visually distinguishes (520) visual marks in a second set of visual marks (e.g., visual marks 436-1, 436-13, and 436-25, FIG. 4E) from other visual marks in the chart (e.g., by highlighting or otherwise visually emphasizing visual marks in the second set of marks and/or by dimming or otherwise visually deemphasizing the remaining visual marks in the chart that are not part of the second set of visual marks). The second set of visual marks is distinct from the first set of visual marks. The second set of visual marks includes a visual mark at the first position in the first pane (e.g., visual mark 436-1, FIG. 4E). The second set of visual marks corresponds to the first selected option for a type of calculation and the second selected option for a type of data partitioning (for a selected type of calculation). In FIG. 4E, the first selected option for a type of calculation is option 422-1, a "percent of total" calculation. In FIG. 4E, the second selected option 424 for a type of data partitioning (for a selected type of calculation) is "Table (Down)," which corresponds to one column 434 in the chart.

In some embodiments, while displaying visual marks in the first set of visual marks visually distinguished from other visual marks in the chart, the device detects (522) an input that changes the current focus to a second visual mark in a second pane in the plurality of panes (e.g., a mouse click or finger tap gesture on the second visual mark, such as a click on visual mark 412-13 in FIG. 4D), distinct from the first visual mark. In response to detecting the input that changes the current focus to a second visual mark in a second pane in the plurality of panes, the device visually distinguishes visual marks in a third set of visual marks (visual marks 412-13 to 412-24, FIG. 4D) from other visual marks in the chart (e.g., by highlighting or otherwise visually emphasizing visual marks in the third set of marks and/or by dimming or otherwise visually deemphasizing the remaining visual marks in the chart that are not part of the third set of visual marks). The third set of visual marks is distinct from the first set of visual marks. The third set of visual marks includes the second visual mark. The third set of visual marks corresponds to the first selected option for a type of calculation and the first selected option for a type of data partitioning (for a selected type of calculation).

In some embodiments, while displaying visual marks in the first set of visual marks visually distinguished from other visual marks in the chart with the current focus on the first visual mark, the device detects (524) an input that selects a second option for a type of calculation (e.g., a mouse click or finger tap gesture in the chart-calculations-options area on an icon for the second option for a type of calculation, like that discussed above with respect to FIGS. 4J-4K), distinct from the first option for a type of calculation. In response to detecting the input that selects the second option for a type of calculation, the device visually distinguishes visual marks in a fourth set of visual marks (e.g., visual marks 462-1 to 462-12, FIG. 4L) from other visual marks in the chart (e.g., by highlighting or otherwise visually emphasizing visual marks in the fourth set of marks and/or by dimming or otherwise visually deemphasizing the remaining visual marks in the chart that are not part of the fourth set of visual marks). The fourth set of visual marks is distinct from the first set of visual marks. The fourth set of visual marks includes a visual mark at the first position in the first pane. The fourth set of visual marks corresponds to the second selected option for a type of calculation and a selected option for a type of data partitioning (for a selected type of calculation, such as the first selected option for a type of data partitioning). For example, in FIG. 4L, the second selected option for a type of calculation is option 422-2, a "running total" calculation. In FIG. 4L, a selected option 424 for a type of data partitioning (for a "running total" calculation) is "Table (Across)," which corresponds to one row 414 in the chart.

In some embodiments, while displaying visual marks in the first set of visual marks visually distinguished from other visual marks in the chart, the device detects (526) a first input (e.g., a mouse click or finger tap gesture on an icon to close the chart-calculations-options area 420). In response to detecting the first input, the device ceases to display the chart-calculations-options area and ceases to visually distinguish visual marks in the first set of visual marks from other visual marks in the chart, as illustrated in FIGS. 4O-4P.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
at an electronic device with a display:
displaying a chart on the display, wherein the chart includes a first set of visual marks that represent values derived from a set of data;
concurrently displaying a chart-calculations-options area with the chart on the display, wherein the chart-calculations-options area displays a first plurality of options for type of calculation, the first plurality of options including a plurality of: an option for a running total, an option for a percent of total, an option for a percent from, an option for a difference from, an option for a percent difference from, an option for a rank, an option for a percentile, and an option for a moving calculation;
detecting user selection of (i) a first option, from the first plurality of options, for type of calculation and (ii) a second option corresponding to a parameter for the selected first option; and
in response to detecting the user selection, visually distinguishing visual marks in a second set of visual marks in the chart, wherein:
the second set of visual marks is distinct from the first set of visual marks; and
the second set of visual marks corresponds to the first option for type of calculation and the second option corresponding to the parameter for the selected first option.

2. The method of claim 1, wherein:
the chart comprises a bar chart; and
the first set of visual marks is a set of bars in the bar chart.

3. The method of claim 1, wherein:
the user selection of the first option from the first plurality of options comprises user selection of the option for a running total; and
the method further comprises:
displaying a respective numerical value for a respective visual mark in the running total with the respective visual mark.

4. The method of claim 1, wherein the parameter for the selected first option comprises a data field.

5. The method of claim 1, wherein the parameter for the selected first option comprises a type of data partitioning.

6. The method of claim 5, wherein the type of data partitioning includes one of:
data partitioning corresponding to each row in the chart;
data partitioning corresponding to each column in the chart;
data partitioning corresponding to the entire chart;
data partitioning corresponding to each pane in the chart;
data partitioning corresponding to calculated values progressing left-to-right, then top-to bottom in the chart; or
data partitioning corresponding to calculated values progressing top-to bottom, then left-to-right in the chart.

7. The method of claim 1, further comprising:
while displaying visual marks in the first set of visual marks visually distinguished from other visual marks in the chart, detecting a first input; and
in response to detecting the first input:
ceasing to display the chart-calculations-options area; and ceasing to visually distinguish visual marks in the first set of visual marks from other visual marks in the chart.

8. The method of claim 1, wherein:
the chart includes a plurality of panes; and
a respective pane in the plurality of panes includes a plurality of visual marks.

9. The method of claim 8, wherein each visual mark in the plurality of visual marks corresponds to a sub-column within the respective pane.

10. The method of claim 8, wherein each visual mark in the plurality of visual marks corresponds to a sub-row within the respective pane.

11. An electronic device, comprising:
a display;
one or more processors;
memory; and
one or more programs, wherein the one or more programs are stored in the memory and configured to be executed by the one or more processors, the one or more programs including instructions for:
displaying a chart on the display, wherein the chart includes a first set of visual marks that represent values derived from a set of data;
concurrently displaying a chart-calculations-options area with the chart on the display, wherein the chart-calculations-options area displays a first plurality of options for type of calculation, the first plurality of options including a plurality of: an option for a running total, an option for a percent of total, an option for a percent from, an option for a difference from, an option for a percent difference from, an option for a rank, an option for a percentile, and an option for a moving calculation;
detecting user selection of (i) a first option, from the first plurality of options, for type of calculation and (ii) a second option corresponding to a parameter for the selected first option; and
in response to detecting the user selection, visually distinguishing visual marks in a second set of visual marks in the chart, wherein:
the second set of visual marks is distinct from the first set of visual marks; and
the second set of visual marks corresponds to the first option for type of calculation and the second option corresponding to the parameter for the selected first option.

12. The electronic device of claim 11, wherein:
the chart comprises a bar chart; and
the first set of visual marks is a set of bars in the bar chart.

13. The electronic device of claim 11, wherein:
the user selection of the first option from the first plurality of options comprises user selection of the option for a running total; and
the one or more programs further include instructions for:
displaying a respective numerical value for a respective visual mark in the running total with the respective visual mark.

14. The electronic device of claim 11, wherein the parameter for the selected first option comprises a data field.

15. The electronic device of claim 11, wherein the parameter for the selected first option comprises a type of data partitioning.

16. A non-transitory computer readable storage medium storing one or more programs comprising instructions configured for execution by an electronic device with a display, the one or more programs including instructions for:
displaying a chart on the display, wherein the chart includes a first set of visual marks that represent values derived from a set of data;
concurrently displaying a chart-calculations-options area with the chart on the display, wherein the chart-calculations-options area displays a first plurality of options for type of calculation, the first plurality of options including a plurality of: an option for a running total, an option for a percent of total, an option for a percent from, an option for a difference from, an option for a percent difference from, an option for a rank, an option for a percentile, and an option for a moving calculation;
detecting user selection of (i) a first option, from the first plurality of options, for type of calculation and (ii) a second option corresponding to a parameter for the selected first option; and
in response to detecting the user selection, visually distinguishing visual marks in a second set of visual marks in the chart, wherein:
the second set of visual marks is distinct from the first set of visual marks; and
the second set of visual marks corresponds to the first option for type of calculation and the second option corresponding to the parameter for the selected first option.

17. The non-transitory computer readable storage medium of claim 16, wherein:
the chart comprises a bar chart; and
the first set of visual marks is a set of bars in the bar chart.

18. The non-transitory computer readable storage medium of claim 16, wherein:
the user selection of the first option from the first plurality of options comprises user selection of the option for a running total; and
the one or more programs further include instructions for:
displaying a respective numerical value for a respective visual mark in the running total with the respective visual mark.

19. The non-transitory computer readable storage medium of claim 16, wherein the parameter for the selected first option comprises a data field.

20. The non-transitory computer readable storage medium of claim 16, wherein the one or more programs further include instructions for:
while displaying visual marks in the first set of visual marks visually distinguished from other visual marks in the chart, detecting a first input; and
in response to detecting the first input:
ceasing to display the chart-calculations-options area; and
ceasing to visually distinguish visual marks in the first set of visual marks from other visual marks in the chart.

* * * * *